United States Patent
Liu et al.

(10) Patent No.: US 11,961,333 B2
(45) Date of Patent: Apr. 16, 2024

(54) DISENTANGLED REPRESENTATIONS FOR GAIT RECOGNITION

(71) Applicant: Board of Trustees of Michigan State University, East Lansing, MI (US)

(72) Inventors: Xiaoming Liu, Okemos, MI (US); Ziyuan Zhang, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 115 days.

(21) Appl. No.: 17/466,117

(22) Filed: Sep. 3, 2021

(65) Prior Publication Data

US 2022/0148335 A1    May 12, 2022

Related U.S. Application Data

(60) Provisional application No. 63/074,082, filed on Sep. 3, 2020.

(51) Int. Cl.
| | |
|---|---|
| *G06V 40/00* | (2022.01) |
| *G06V 10/74* | (2022.01) |
| *G06V 10/774* | (2022.01) |
| *G06V 10/82* | (2022.01) |
| *G06V 40/10* | (2022.01) |
| *G06V 40/20* | (2022.01) |

(52) U.S. Cl.
CPC ........... *G06V 40/25* (2022.01); *G06V 10/761* (2022.01); *G06V 10/774* (2022.01); *G06V 10/82* (2022.01); *G06V 40/10* (2022.01)

(58) Field of Classification Search
CPC ........ G06V 40/25; G06V 40/23; G06V 40/20; G06V 10/761; G06V 10/82; G06V 10/757; G06V 10/774
See application file for complete search history.

(56) References Cited

U.S. PATENT DOCUMENTS

| | | | |
|---|---|---|---|
| 2011/0311129 A1* | 12/2011 | Milanfar | G06V 10/50 382/154 |
| 2019/0187265 A1* | 6/2019 | Barbello | G06F 18/22 |
| 2020/0342216 A1* | 10/2020 | Binsaadoon | G06F 18/214 |
| 2020/0372613 A1* | 11/2020 | Zhou | G06V 10/462 |
| 2021/0064048 A1* | 3/2021 | Dariush | G06V 40/20 |
| 2021/0158028 A1* | 5/2021 | Wu | G16H 30/20 |
| 2021/0224947 A1* | 7/2021 | Lee | G06N 3/047 |
| 2021/0311554 A1* | 10/2021 | McFarland, Jr. | G06Q 20/40145 |

(Continued)

FOREIGN PATENT DOCUMENTS

CN        112699265 A  *  4/2021 ............. G06F 16/53

*Primary Examiner* — Molly Wilburn
*Assistant Examiner* — Ahmed A Nasher
(74) *Attorney, Agent, or Firm* — Harness, Dickey & Pierce, PLC

(57) ABSTRACT

Gait, the walking pattern of individuals, is one of the important biometrics modalities. Most of the existing gait recognition methods take silhouettes or articulated body models as gait features. These methods suffer from degraded recognition performance when handling confounding variables, such as clothing, carrying and viewing angle. To remedy this issue, this disclosure proposes to explicitly disentangle appearance, canonical and pose features from RGB imagery. A long short-term memory integrates pose features over time as a dynamic gait feature while canonical features are averaged as a static gait feature. Both of them are utilized as classification features.

19 Claims, 17 Drawing Sheets

(56) References Cited

U.S. PATENT DOCUMENTS

2021/0346761 A1* 11/2021 Sterling ................ G06V 20/46
2022/0076005 A1* 3/2022 Kudo ..................... G06F 18/21

* cited by examiner

DISENTANGLED REPRESENTATIONS FOR GAIT RECOGNITION

CROSS-REFERENCE TO RELATED APPLICATIONS

This application claims the benefit of U.S. Provisional Application No. 63/074,082, filed on Sep. 3, 2020. The entire disclosure of the above application is incorporated herein by reference.

GOVERNMENT CLAUSE

This invention was made with government support under W911NF-18-1-0330 awarded by the U.S. Army Research Laboratory. The government has certain rights in the invention.

FIELD

The present disclosure relates to gait recognition.

BACKGROUND

Biometrics measures people's unique physical and behavioral characteristics to recognize the identity of an individual. Gait, the walking pattern of an individual, is one of biometrics modalities besides face, fingerprint, iris etc. Gait recognition has the advantage that it can operate at a distance without users' cooperation. Also, it is difficult to camouflage. Due to these advantages, gait recognition is applicable to many applications such as person identification, criminal investigation, and healthcare.

As another recognition problem, gait data can usually be captured by five types of sensors, i.e., RGB camera, RGB-D camera, accelerometer, floor sensor, and continuous-wave radar. Among them RGB camera is not only the most popular one due to the low sensor cost, but also the most challenging one since RGB pixels might not be effective in capturing the motion cue. This disclosure studies gait recognition from RGB cameras.

The core of gait recognition lies in extracting gait features from the video frames of a walking person, where the prior work can be categorized into two types: appearance-based and model-based methods. The appearance-based methods, e.g., Gait Energy Image (GEI), take the averaged silhouette image as the gait feature. While having a low computational cost and can handle low-resolution imagery, it can be sensitive to variations, such as cloth change, carrying view angles and walking speed. The model-based methods use the articulated body skeleton from pose estimation as the gait feature. They show more robustness to the aforementioned variations but at a price of a higher computational cost and dependency on pose estimation accuracy.

It is understandable that the challenge in designing a gait feature is the necessity of being invariant to the appearance variation due to clothing, viewing angle, carrying, etc. Therefore, it is desirable to disentangle gait features from the non-gait-related appearance of the walking person. For both appearance-based or model-based methods, such disentanglement is achieved by manually handcrafting the GEI-like, or body skeleton-like features, since neither has color or texture in formation. However, this disclosure argues that these manual disentanglements may be sensitive to walking condition changes. In other words, they can lose certain or create redundant gait information. For example, GEI-like features have distinct silhouettes for the same subject wearing different clothes. For skeleton-like features, when carrying accessories (e.g., bags, umbrella) certain body joints, such as hands, may have fixed positions, and hence are redundant information to gait.

To remedy the aforementioned issues in handcrafted features, this disclosure proposes a novel approach to learn gait representations from the RGB video directly. Specifically, this disclosure aims to automatically disentangle dynamic pose features (trajectory of gait) from pose-irrelevant features. To further distil identity information from pose-irrelevant features, the pose-irrelevant features are disentangled into appearance (i.e., clothing) and canonical features. Here, the canonical feature refers to a standard and unique representation of the human body, such as body shape, shoulder width, limb lengths, etc. The pose features and canonical features are discriminative in identity and are used for gait recognition.

SUMMARY

This section provides a general summary of the disclosure, and is not a comprehensive disclosure of its full scope or all of its features.

A computer-implemented method is presented for identifying a person. A plurality of features sets are stored for known persons, where each feature set includes an identifier for a person, canonical features for the person and gait features for the person. The method includes: receiving a set of images for a given person walking over a period of time; extracting canonical features of the given person from the set of images using a first neural network, where the canonical features describe body shape of the given person; extracting gait features of the given person from the set of images using the first neural network and a second neural network, where the gait features describe gait of the given person; and identifying, by the image processor, the given person by comparing the canonical features of the given person and the gait features of the given person to the plurality of feature sets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
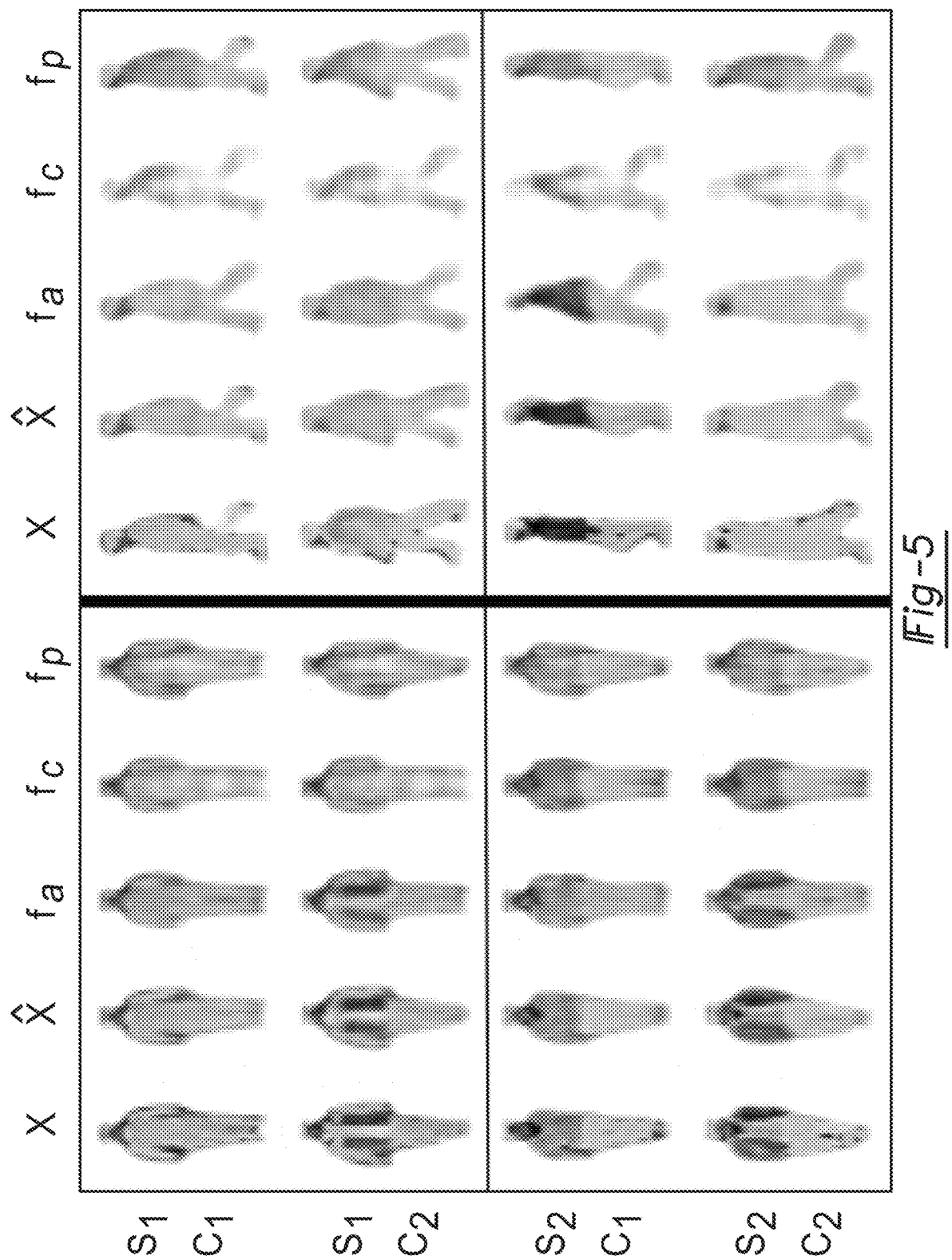

FIG. 5 shows the synthesis by decoding three features individually, $f_a$, $f_c$ and $f_p$. and their concatenation. Left and right parts are two learnt models on frontal and side views of CASIA-B. The top two rows are two frames of the same subject under different conditions (NM vs. CL) and the bottom two are another subject. The reconstructed frames $\hat{x}$ closely match the $\hat{x}$ original input, $f_c$ shows consistent body shape for the same subject while different for different subjects, $f_a$ recovers the appearance of clothes, at the pose specified by $f_c$. The body pose of $f_p$ matches with the input frame.

Figure 6:
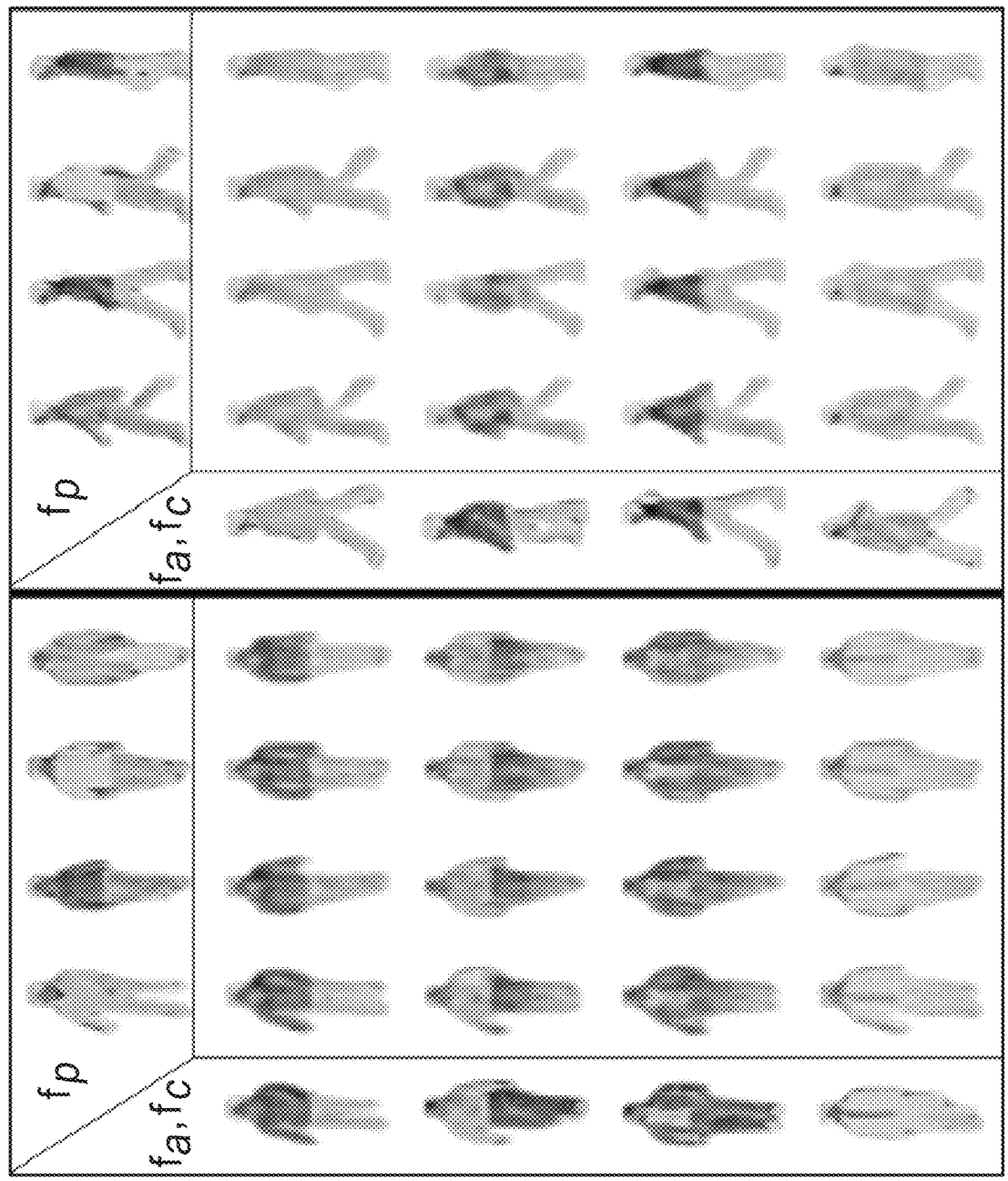

FIG. 6 shows the synthesis by decoding pairs of pose features $f_p$, and pose-irrelevant features, $\{f_a, f_c\}$. Left and right parts are examples of frontal and side views of CASIA-B. In either part, each of 4×4 synthetic images is $D\{f_a^l, f_c^l, f_p^{rl}\}$, where $\{f_a^l, f_c^l\}$ is extracted from images in the first column and is from the top row. The synthetic images resemble the appearance of the first column and the pose of the top row.

FIG. 7A-7D are plots showing the t-SNE visualization of (a) appearance features $f_a$, (b) canonical features $f_c$, (c) pose features $f_p$, and (d) dynamic gait features $f_{dyn\text{-}gait}$, respectively. Select 5 subjects each with two videos of NM vs. CL conditions. Each point represents a single frame, whose color is for subject ID, shape of 'dot' and cross' is NM and CL respectively, and size is frame index.

Figure 8:
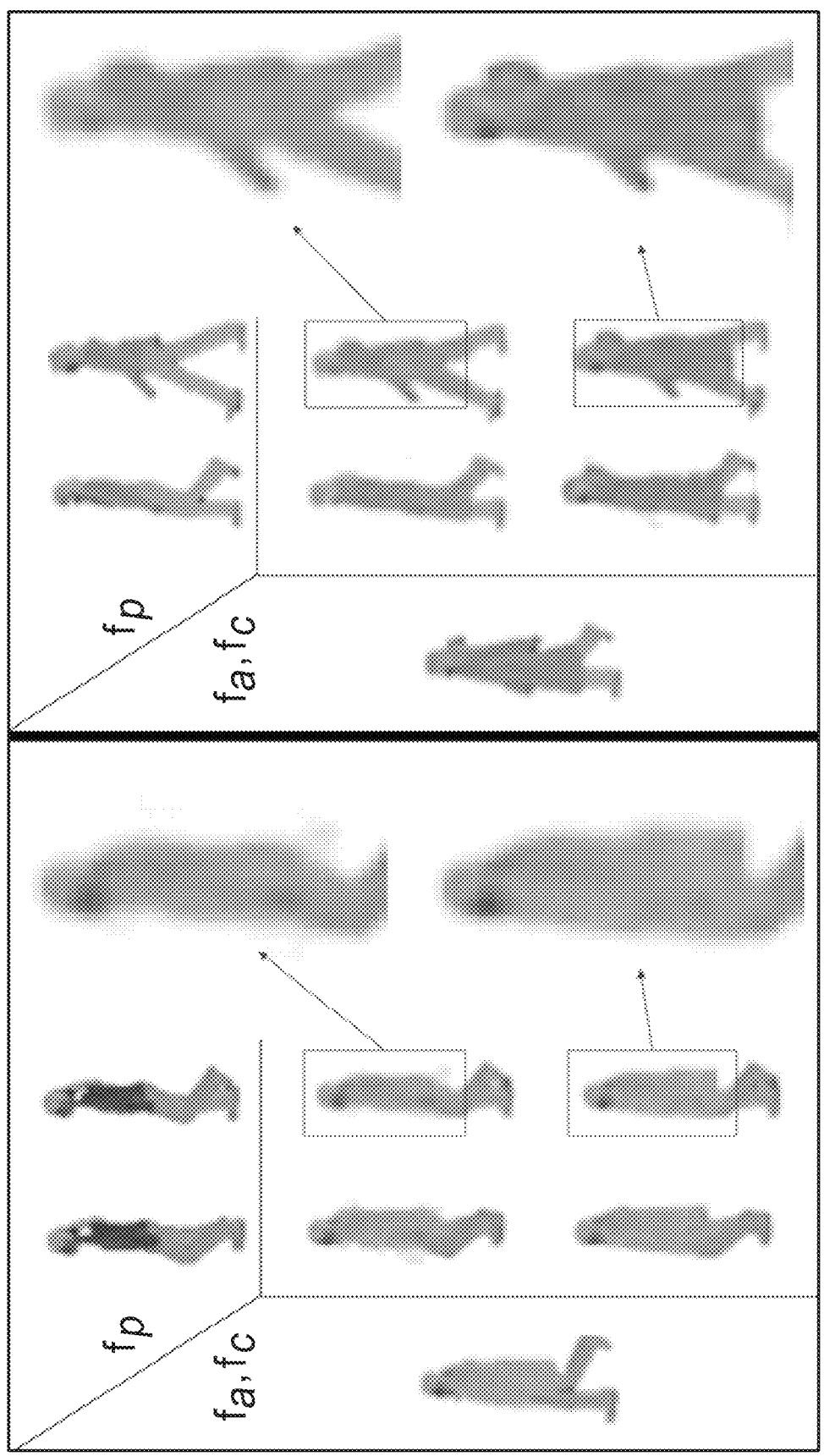
Figure 9A:
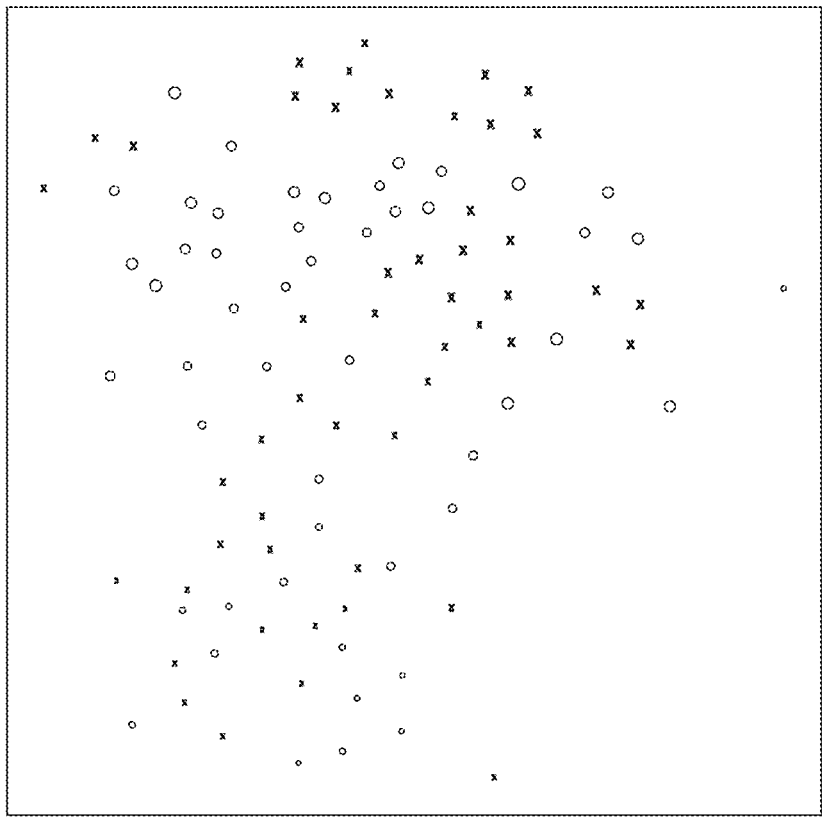
Figure 9B:
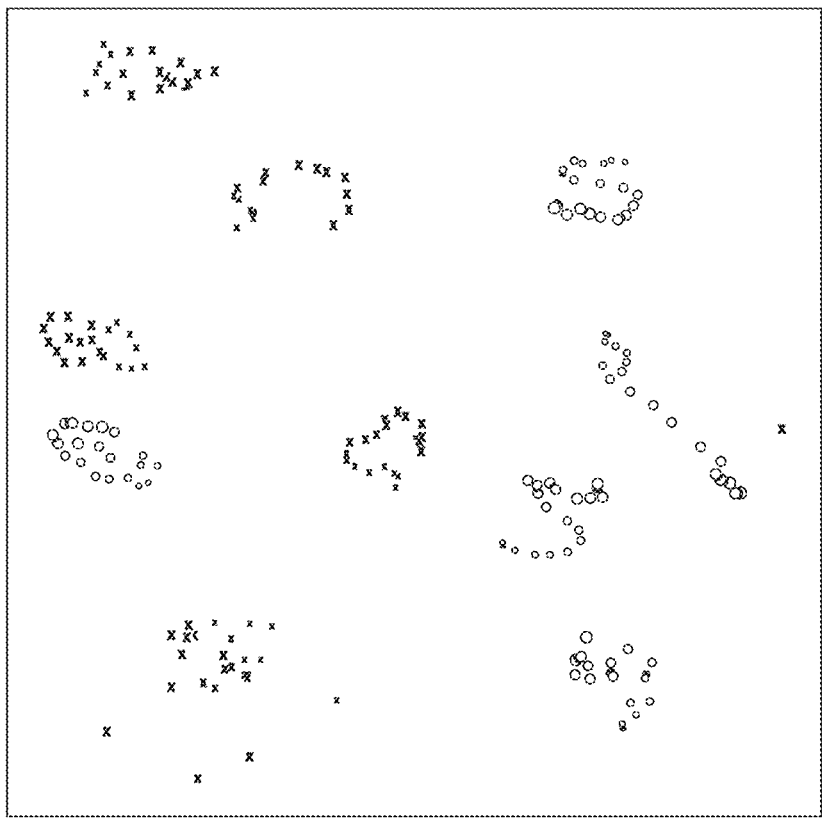
Figure 9C:
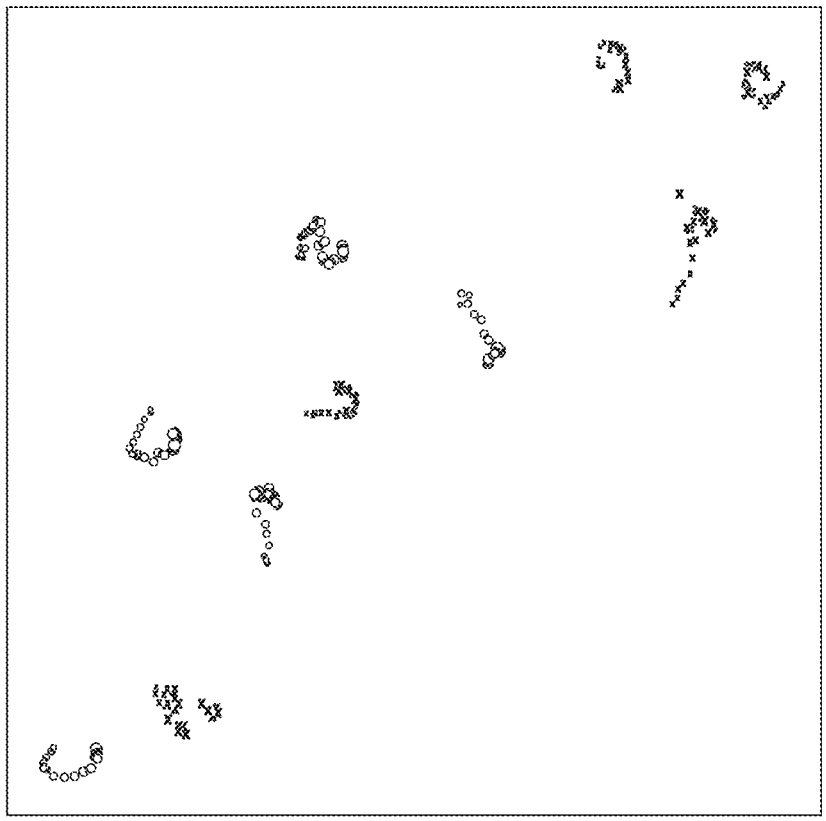
Figure 9D:
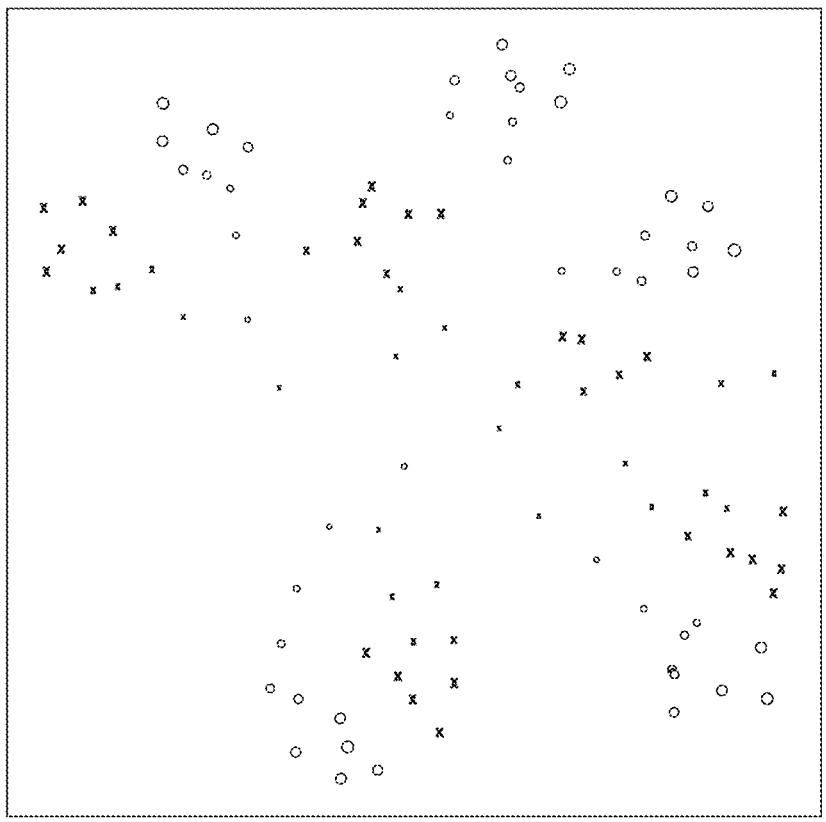
Figure 9E:
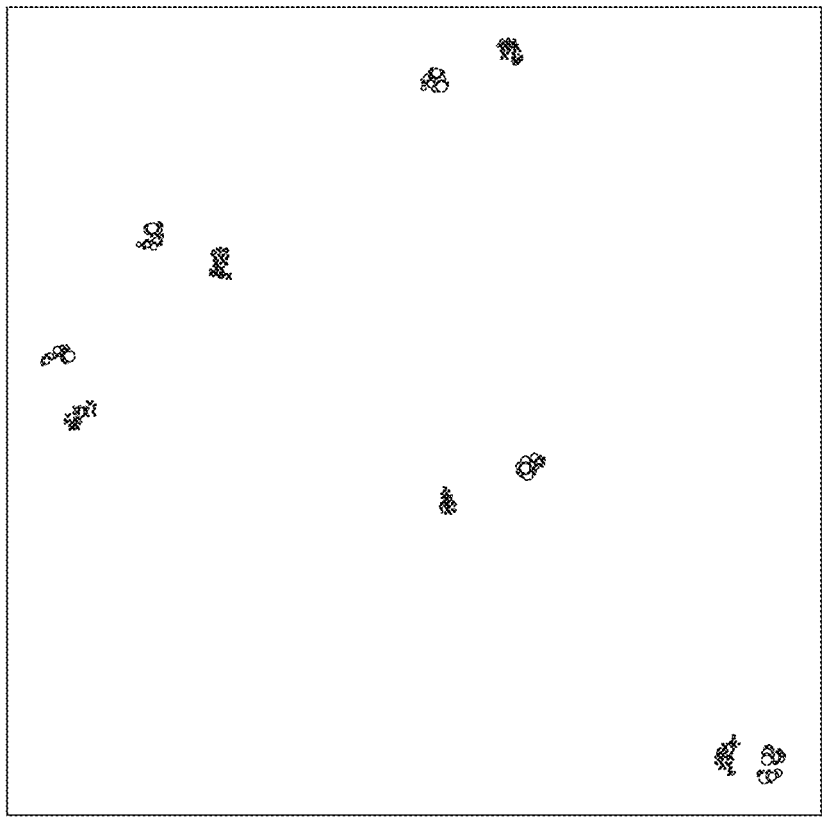
Figure 9F:
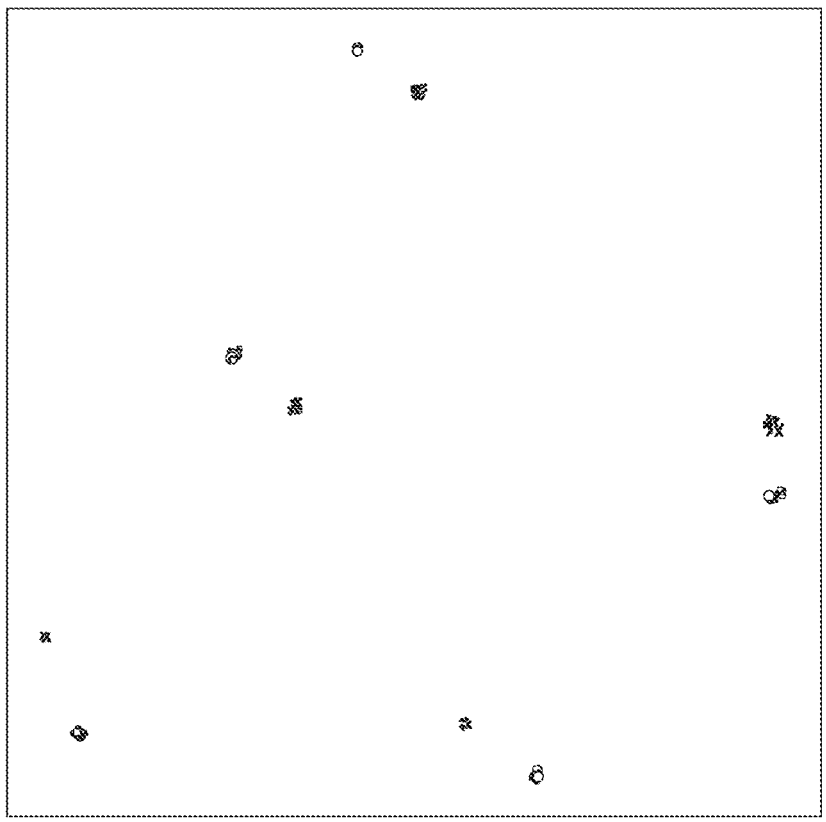

FIG. 8 show the synthesis on CASIA-B by decoding pose-irrelevant feature $\{f_a, f_c\}$ and pose feature $f_p$ from videos under NM vs. CL conditions. Left and right parts are two examples. For each example, $\{f_a, f_c\}$ is extracted from the first column (CL) and $f_p$ is from the top row (NM). Top row synthetic images are generated from model trained without $L_{pose\text{-}sim}$ loss, bottom row is with the loss. To show the difference, details in synthetic images are magnified.

FIGS. 9A-9F are plots showing the t-SNE visualization of $f_{dyn\text{-}gait}$, from five subjects, each with 2 videos (NM vs. CL). The symbols are defined the same as FIG. 7. The top and bottom rows are two models learnt with $L_{id\text{-}single}$ and $L_{id\text{-}inc\text{-}avg}$ loss respectively. From left to tight, the points are $f_{dyn\text{-}gait}$, of the first 10 frames, 10-30 frames, and 30-60 frames. Learning with $L_{id\text{-}inc\text{-}avg}$ leads to more discriminative dynamic features for the entire duration.

Figure 10:
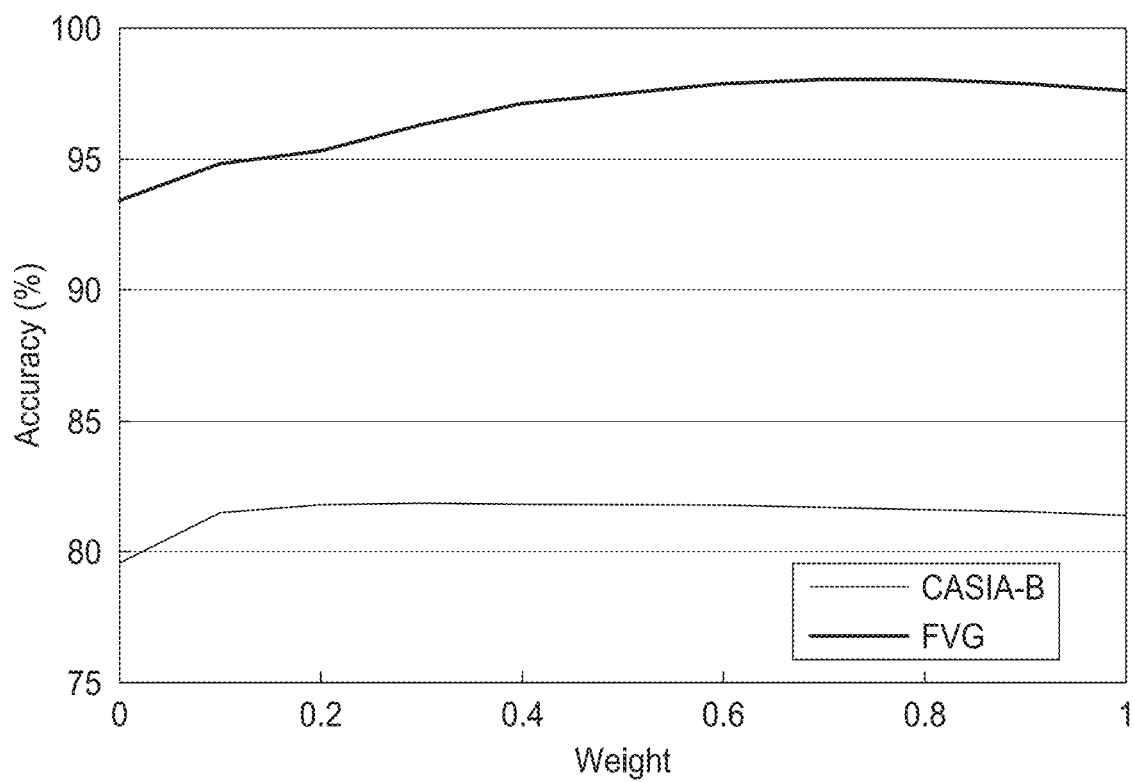

FIG. 10 is a graph showing recognition by fusing $f_{dyn\text{-}gait}$ and $f_{sta\text{-}gait}$, scores with different weights as defined in equation 13. Rank-1 accuracy and TAR@1 % FAR is calculated for CASIA-B and FVG, respectively.

Figure 11A:
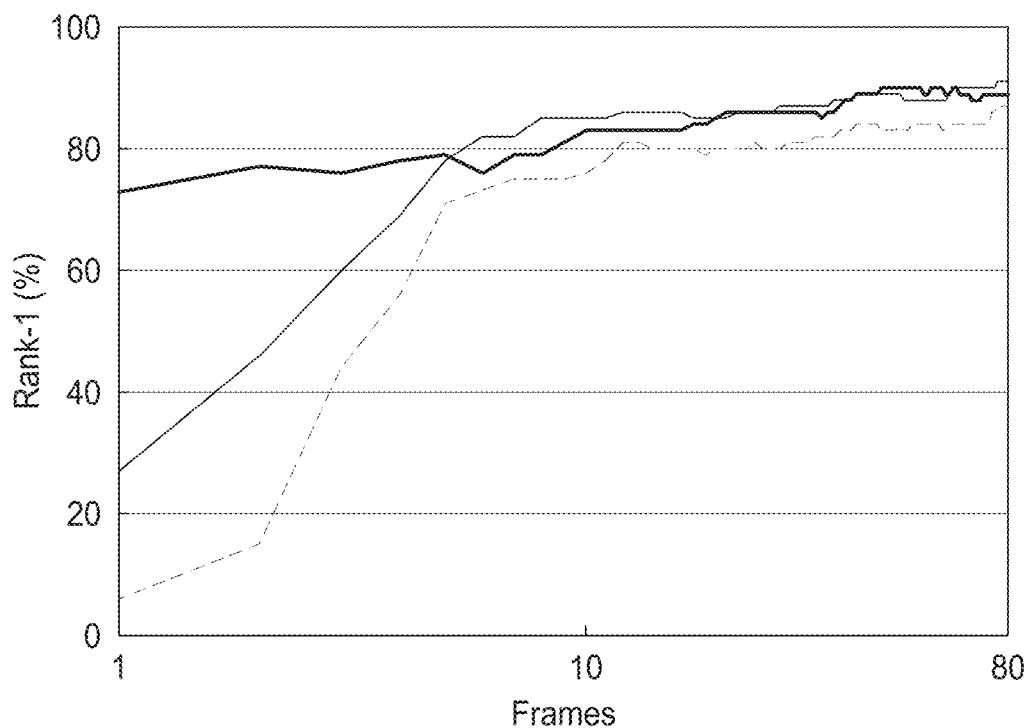
Figure 11B:
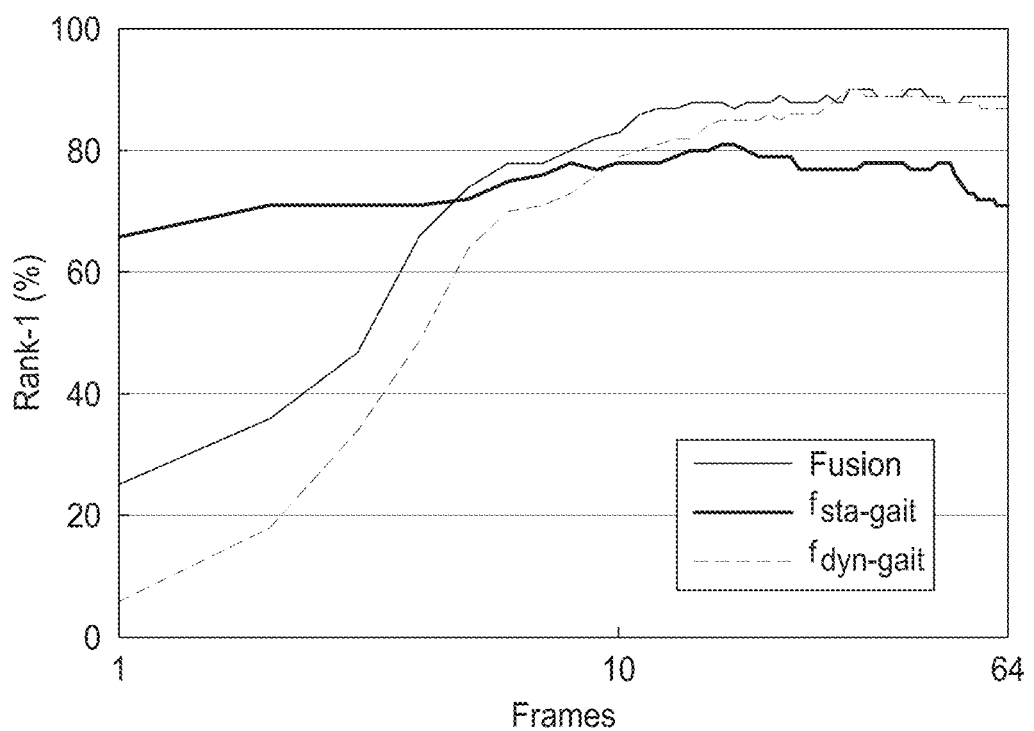

FIGS. 11A and 11B are graphs showing recognition performance on frontal-frontal view and side-side view, respectively, at different video lengths. Different feature scores ($f_{sta\text{-}gait}$, $f_{dyn\text{-}gait}$, and their fusion) are used on NM-CL, BG conditions of CAISA-B.

Figure 12A:
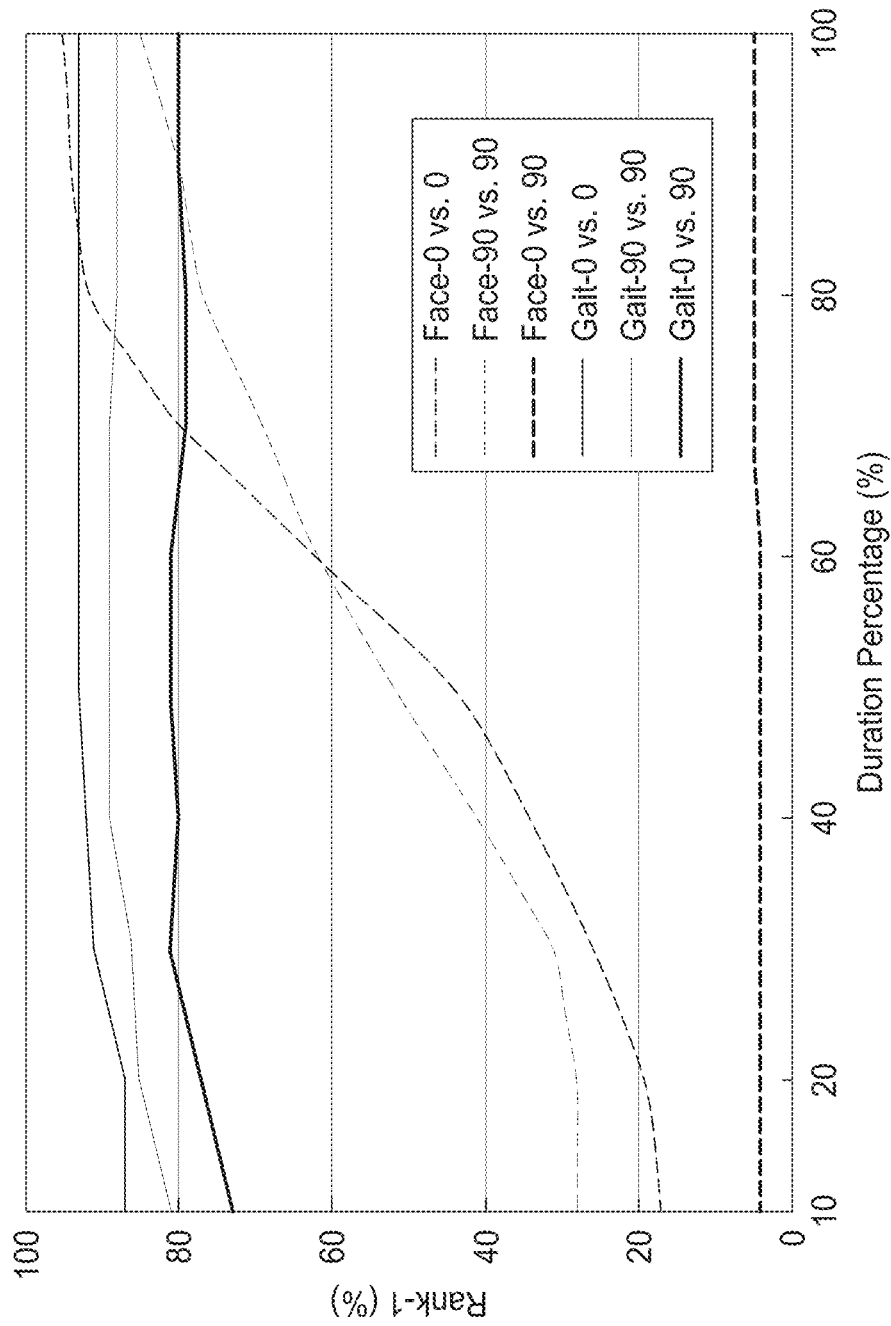
Figure 12B:
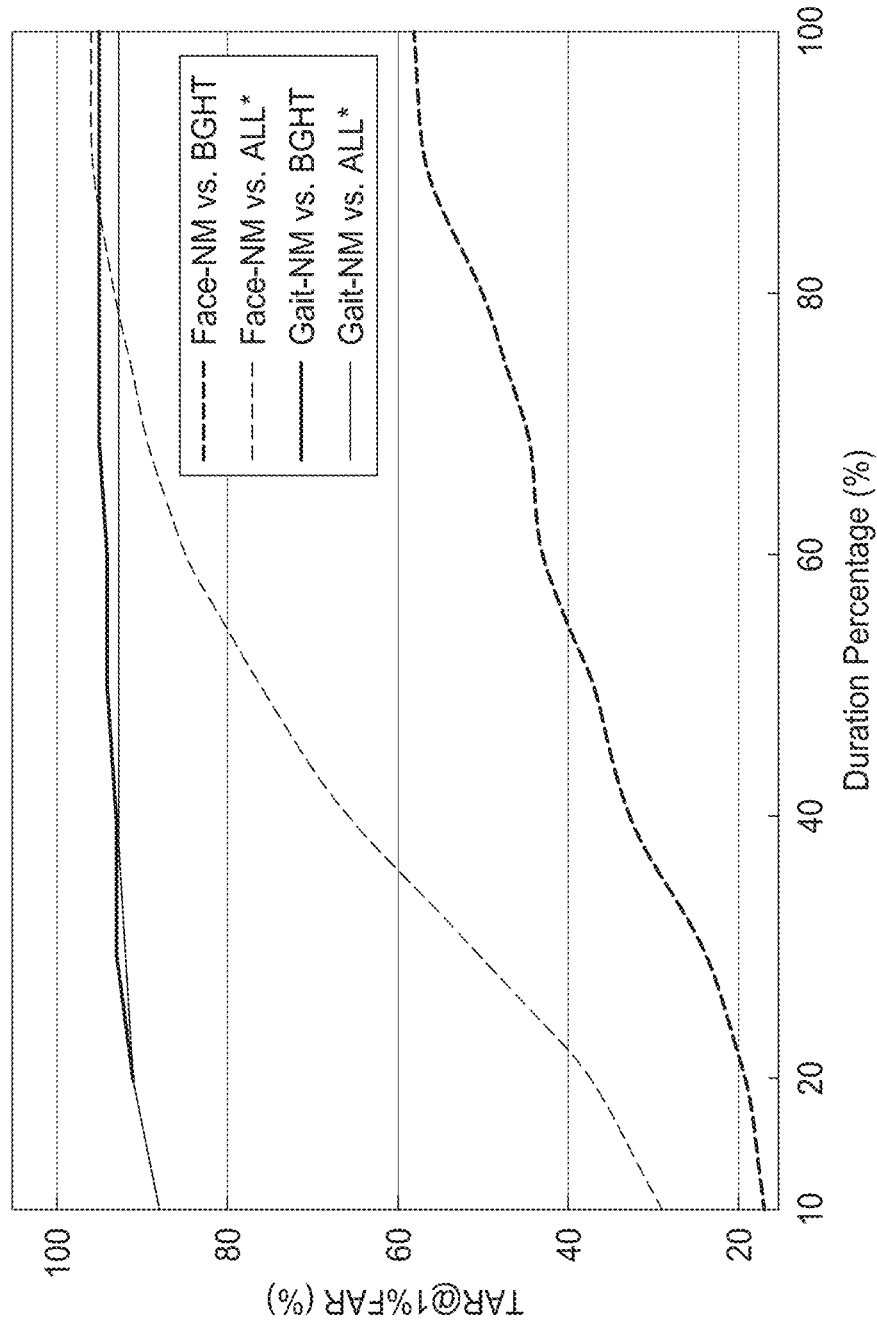

FIGS. 12A and 12B are graphs comparing gait and face recognition on CASIA-B and FVG, respectively. Classification accuracy scores along with video duration percentage are calculated. In CASIA-B, both gait and face recognition are performed in three scenarios: frontal-frontal (0° vs. 0°), side-side (90° vs. 90°) and frontal-side (0° vs. 90°). In FVG, both recognitions use NM vs. BGHT and NM vs. ALL* protocols. Detected face examples are shown on the top of each frontal and side view plots under various video duration percentage.

Figure 13:

FIG. 13 shows examples in CASIA-B and FVG where the SOTA face recognizer ArcFace fails. The first row is the image of probe set; the second row is the recognized wrong person in gallery; and the third row shows the genuine gallery. The first three columns are three scenarios of CASIA-B and the last two columns are two protocols of FVG.

Figure 14:
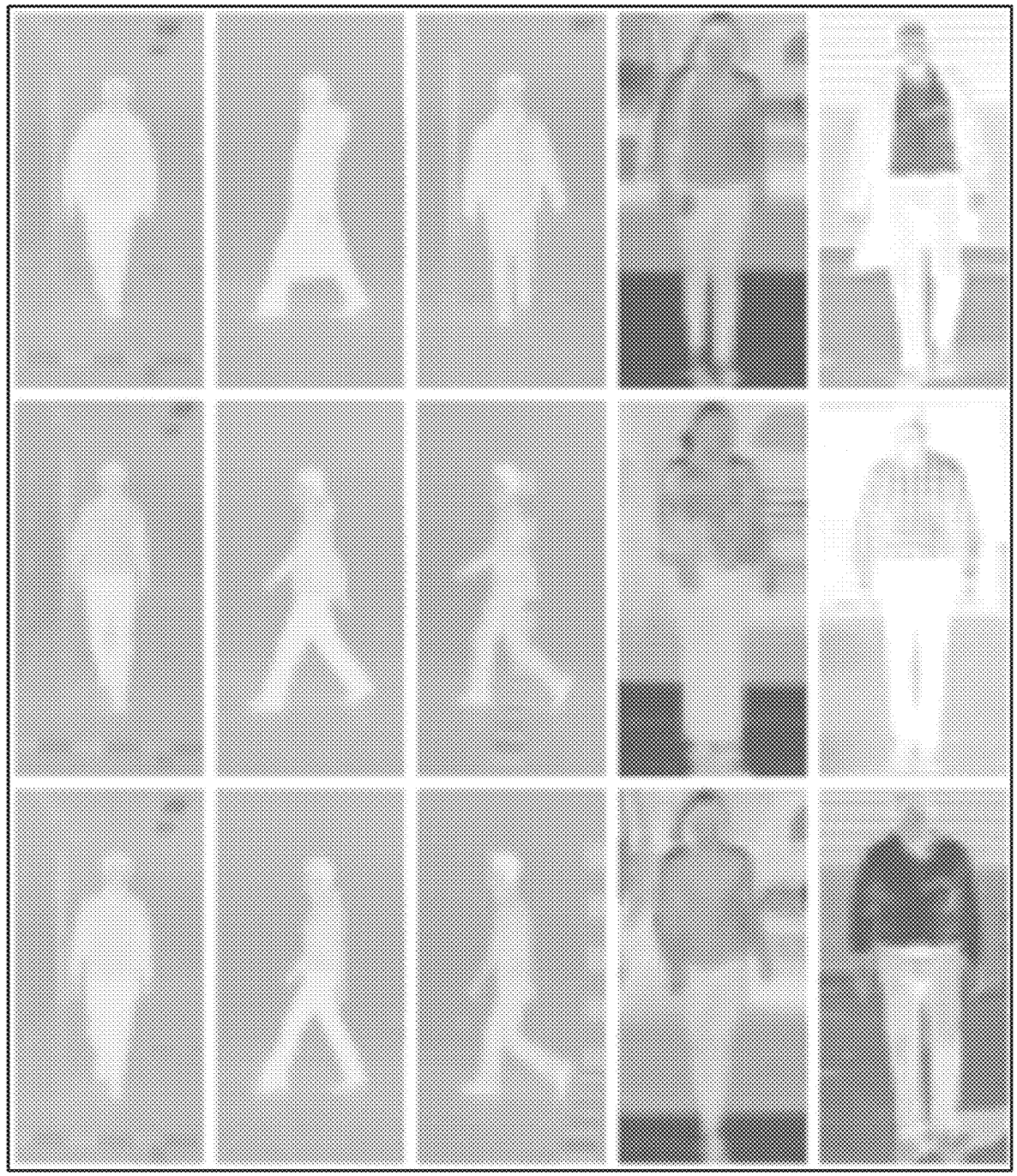

FIG. 14 show failure cases of the proposed recognition system on CASIB-B and FVG due to blurry and illumination conditions.

Corresponding reference numerals indicate corresponding parts throughout the several views of the drawings.

DETAILED DESCRIPTION

Example embodiments will now be described more fully with reference to the accompanying drawings.

Start with a simple example. Assuming there are three videos, where videos 1 and 2 capture subject A wearing t-shirt and long down coat respectively, and in video 3 subject B wears the same long down coat as in video 2. The objective is to design an algorithm, from which the gait features of video 1 and 2 are the same, while those of video 2 and 3 are different. Clearly, this is a challenging objective, as the long down coat can easily dominate the extracted feature, which would make video 2 and 3 to be more similar than 1 and 2 in the latent space of gait features. Indeed, the core challenge, as well as the objective, of gait recognition is to extract gait features that are discriminative among subjects, but invariant to different confounding factors, such as viewing angles, walking speeds and changing clothes. Table 2 below summarizes the symbol and notation used in this disclosure.

Appearance features, however, contain certain discriminative information, which can be useful for identity classification. For instance, imagine if one ignores the body pose, e.g., the position of arms and legs, and clothing information, e.g., color and texture of clothes, one can still tell apart different subjects by their inherent body characteristics, which can include categories of overall body shape (e.g., rectangle, triangle, inverted triangle, and hourglass), shoulder width, waistline, arm length, torso vs. leg ratio, etc. In other words, even when different people wearing exactly the same clothing and stand still, these characteristics are still subject dependent. Also, for the same subject under various conditions, these characteristics are relatively constant. In this disclosure, features describing the body shape of a person are referred to as canonical feature. Hence, given a walking video $X^c$ under condition c, the proposed framework disentangles the encoded features into three components: the pose feature $f_p$, the appearance feature $f_a$ and the canonical feature $f_c$. The pose feature describes the pose of a person, i.e., the positions of body parts; whereas, dynamics of pose features over time constitute gait features as further described below. The appearance feature describes clothes worn by a person. The concatenation of $f_a$ and $f_c$ is also referred to as the pose-irrelevant feature.

For the majority of gait datasets, there is limited intra-subject appearance variation. Hence, appearance could be a discriminative cue for identification during training as many subjects can be easily distinguished by their clothes. Unfortunately, any feature extractors relying on appearance will not generalize well on the test set or in practice, due to potentially diverse clothing or appearance between two videos of the same subject This limitation on training sets also prevents one from learning ideal feature extractors if solely relying on identification objective. Hence this disclosure proposes to disentangle the canonical and pose feature from the visual appearance. Since a video is composed of frames, disentanglement should be conducted at the frame level first.

Before presenting the details of how to implement disentanglement, the properties of three types of features are described further and summarized in Table 3. These properties are crucial in guiding one to define effective loss functions for disentanglement. The appearance feature mainly describes the clothing information of the subject. Hence, it is constant within a video sequence, but often different across different conditions. Of course, it is not discriminative among individuals. The canonical feature is subject-specific, and is therefore constant across both video frames and conditions. The pose feature is obviously different across video frames, but is assumed to be constant across conditions. Since the pose feature is the manifestation of video-based gait information at a specific frame, the pose feature itself might not be discriminative. However, the dynamics of pose features over time will constitute the dynamic gait feature, which is discriminative among individuals.

Figure 1:
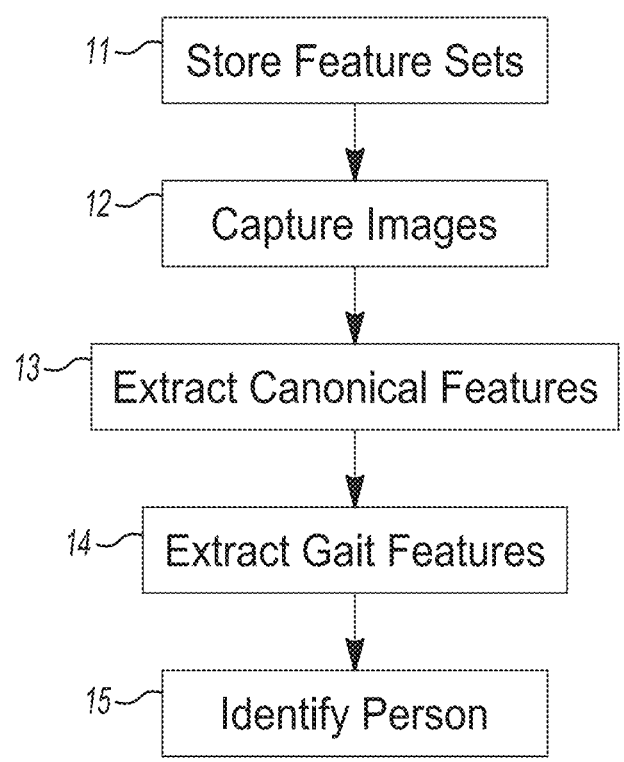
FIG. 1 is a flowchart depicting an improved technique for identifying a person.

FIG. 1 illustrates a technique for identifying a person using these features. This technique relies upon a database of features sets derived from known persons. That is, a plurality of features sets is stored at 11 in a database, such that each feature set corresponds to a different person. Each feature set includes an identifier for a known person, canonical features for the person and gait features for the person. It is envisioned that the feature sets are collected during an enrollment process although other ways of collecting features sets for known persons are also contemplated by this disclosure.

During operation, images of a scene are captured at 12 by an imaging device and input into an image processor of an identification system, where the scene includes a person walking. For each image captured by the imaging device, the person is segmented from the image to thereby form a set of images. Detection and segmentation methods to accomplish this task are readily found in the art.

Canonical features of the given person are extracted at 13 from the set of images using a first neural network. The canonical features describe the body shape of the given person as noted above. By way of example, canonical features can represent at least one of a shoulder width, a waistline or a torso to leg ratio. These examples are merely intended to be illustrative and other metrics describing the body shape of a person can also be represented by canonical features.

Likewise, gait features of the given person are extracted at 14 from the set of images. More specifically, pose features of the given person are first extracted from the set of images, for example using the first neural network, where the pose features describe pose of the given person. Gait features are then generated from the pose features, for example using a second neural network. The first neural network and the second neural network are implemented by the image processor.

Lastly, the given person can be identified at 15 by comparing the canonical features of the given person and the gait features of the given person to the plurality of feature sets residing in the database. To do so, a similarity metric is computed between the canonical features of the given person and each of the features sets. Similarly, a similarity metric is computed between the gait features of the given person and each of the features sets. The person in the captured images is identified when the similarity metrics for a given feature set are high (e.g., exceed a predetermined threshold). In the event the similarity metrics are not sufficiently high for any of the stored feature sets, the person is not identified.

Figure 2:
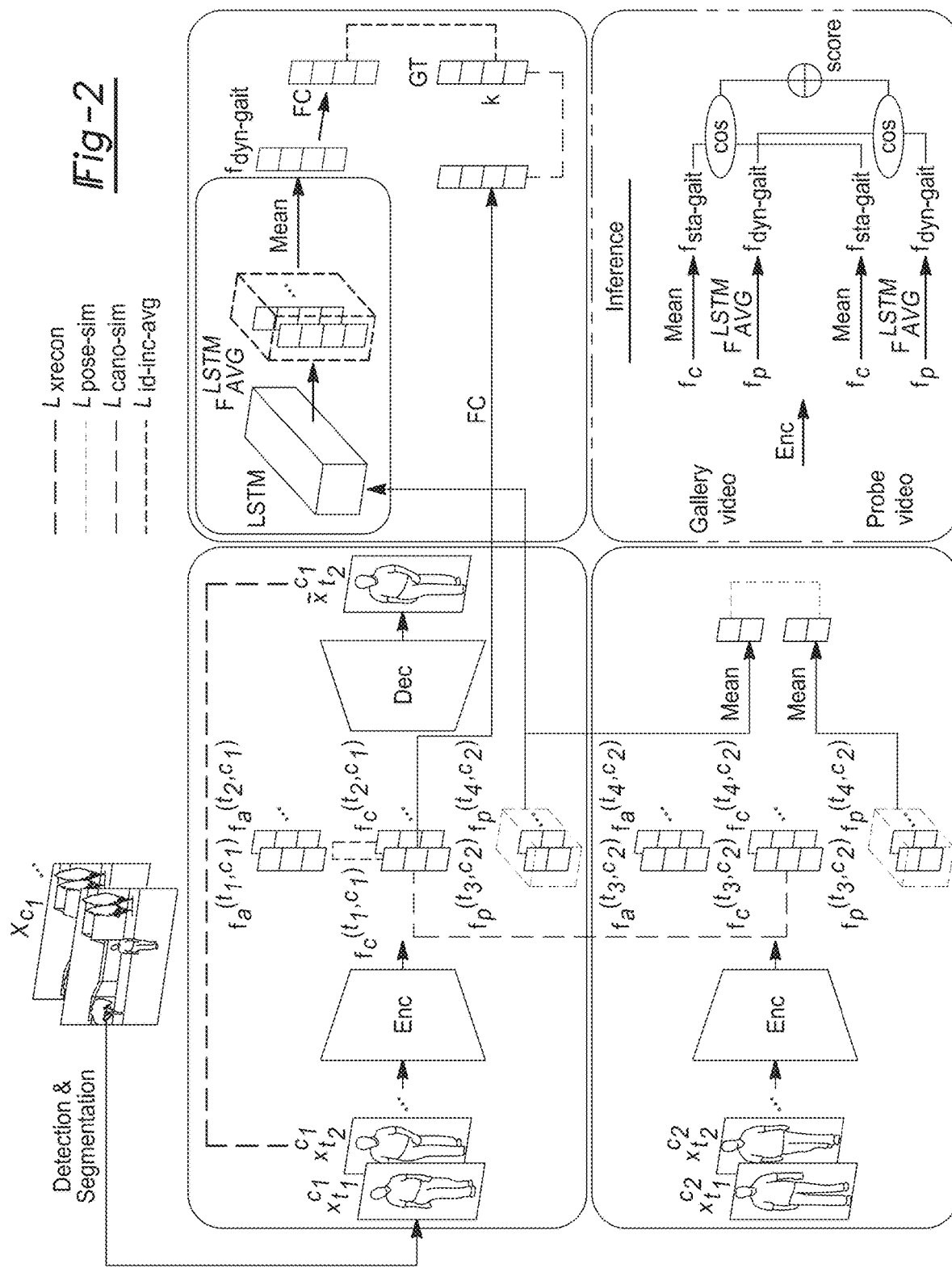
FIG. 2 is a diagram of a proposed network architecture.

To disentangle the pose feature and canonical feature from appearance feature, an encoder-decoder network architecture is proposed as seen in FIG. 2. In this example, the network architecture 20 is comprised of a first neural network 21 and a second neural network 22. The first neural network 21 includes a first encoder 23, a decoder 24, and a secondary encoder 25; whereas, the second neural network 22 is further defined as a long short-term memory.

The first encoder 23 is trained to disentangle features. More specifically, the first encoder, E, encodes a feature representation of each frame, x, and explicitly splits it into three components, namely appearance feature $f_a$, canonical feature $f_c$ and pose feature $f_p$:

$$f_a, f_c, f_p = \varepsilon(x). \quad (1)$$

Collectively these three features are expected to fully describe the original input image. As they can be decoded back to the original input through a decoder D:

$$\hat{x} = D(f_a, f_c, f_p). \quad (2)$$

Various loss functions are defined to jointly train the first encoder $\varepsilon$ and the decoder D.

The reconstructed image $\hat{x}$ should be close to the original input x. However, enforcing self-reconstruction loss as in a typical auto-encoder cannot ensure the meaningful disentanglement as in this design. Hence, a cross reconstruction loss function is proposed. The cross reconstruction loss function uses the appearance feature $f_a^{t1}$ and canonical feature $f_c^{t1}$ of frame $t_1$ and the pose feature $f_p^{t2}$ of frame $t_2$ to reconstruct the latter frame:

$$L_{xrecon} = \|D(f_a^{t2}, f_c^{t1}, f_p^{t1}) - x^{t2}\|_2^2. \quad (3)$$

That is, the cross reconstruction loss function defines an error between a first image and a second image, such that the first image is reconstructed from appearance features, canonical features and pose features extracted from an image from a first set of training images captured at a given time and the second image is reconstructed from appearance features and canonical feature from the image captured at the given time but pose features from an image from the first set of training images captured at a time subsequent to the given time.

The cross reconstruction loss, on one hand, can act as the self-reconstruction loss to make sure the three features are sufficiently representative to reconstruct a video frame. On the other hand, as one can pair a pose feature of a current frame with the canonical and appearance features of any frame in the same video to reconstruct the same target, it enforces both the canonical and appearance features to be similar across all frames within a video. Indeed, according to Table 3, between the pose-irrelevant feature, $f_a$ & $f_c$, and the pose feature $f_p$, the main distinct property is that the former is constant across frames while the latter is not. This is the basis for designing the cross reconstruction loss.

The cross reconstruction loss is able to prevent the pose-irrelevant feature, $f_a$ & $f_c$, to be contaminated by the pose information that changes across frames. If not, $f_a$ or $f_c$ contains some pose information, $D(f_a^{t2}, f_c^{t1}, f_p^{t1})$ and $x^{t2}$ would have different poses. However, clothing/texture and body information may still be leaked into the pose feature $f_p$. In the extreme case, $f_c$ and $f_a$ could be constant vectors while $f_p$ encodes all the information of a video frame.

To encourage $f_p$ including only the pose information, multiple videos of the same subject are leveraged. Given two videos of the same subject with length $n_1$, $n_2$ in two different conditions $c_1$, $c_2$, they contain difference in the person's appearance, i.e., cloth changes. Despite appearance changes, the gait information is assumed to be constant between two videos. Since it's almost impossible to enforce similarity on $f_p$ between video frames as it requires precise frame-level alignment, minimize the similarity between two videos' averaged pose features:

$$\mathcal{L}_{pose-sim} = \left\| \frac{1}{n_1} \sum_{t=1}^{n_1} f_p^{(t,c_1)} - \frac{1}{n_2} \sum_{t=1}^{n_2} f_p^{(t,c_2)} \right\|_2^2. \quad (4)$$

According to Table 3, the pose feature is constant across conditions, which is the basis of the pose similarity loss.

The pose similarity loss can be summarized as follows. Receiving a first set of training images for a particular person; receiving a second set of training images for the particular person, where appearance features for the particular person extracted from the second set of training images differs from the appearance features for the particular person extracted from the first set of training images; and training the first encoder using the first set of training images and the second set of training images in accordance with the pose similarity loss, where the second loss function defines an error a mean of the pose features extracted from the first set of training images and a mean of pose features extracted from a second set of training images.

Next, the canonical feature describes the subject's body characteristics, which is unique over all video frames. To be specific, for two videos of the same subject k in two different conditions $c_1$, $c_2$, the canonical feature is constant across both frames and conditions, as illustrated in Table 3. Table 3 also states that the canonical feature is discriminative across subjects. Hence to enforce the two constancy and the discriminativeness, a canonical consistency loss function is defined as follows:

$$\mathcal{L}_{cano-cons} = \frac{1}{n_1^2} \sum_{i \neq j} \left\| f_c^{(t_i,c_1)} - f_c^{(t_j,c_1)} \right\|_2^2 + \qquad (5)$$

$$\frac{1}{n_1} \sum_i \| f_c^{(t_i,c_1)} - f_c^{(t_i,c_2)} \|_2^2 + \frac{1}{n_1} \sum_i -\log(C_k^{sg}(f_c^{(t_i,c_1)})),$$

where the three terms measure the consistency across frames in a single video, consistency across different videos of the same subject, and identity classification using a classifier $C^{sg}$, respectively.

Even when one can disentangle pose, canonical and appearance information for each video frame, the $f_p$ and $f_c$ have to be aggregated over time, since 1) gait recognition is conducted between two videos instead of two images; 2) not all the $f_c$ from every single frame is guaranteed to have same canonical information; and 3) the current feature $f_p$ only represents the walking pose of the person at a specific instance, which can share similarity with another instance of a different individual. Here, one looks for discriminative characteristics in a person's walking pattern. Therefore, modeling its aggregation for $f_c$ and temporal change for $f_p$ is critical.

One example representation of $f_c$ features across all frames of a video sequence is as follows. Since $f_c$ is assumed to be constant over time, compute the averaged $f_c$ features as a way to aggregate the canonical features over time. Given that $f_c$ describes the body characteristics as if the gait was frozen, the aggregated $f_c$ is called the static gait feature $f_{sta-gait}$.

$$f_{sta-gait} = \frac{1}{n} \sum_{t=1}^n f_c^t. \qquad (3)$$

The second neural network is trained for temporal modeling of poses. For temporal modeling of poses, temporal modeling architectures like the recurrent neural network or long short-term memory (LSTM) work best. For illustration purposes, a multi-layer LSTM structure is used to explore temporal information of pose features, e.g., how the trajectory of subjects' body parts changes over time. With reference to FIG. 2, pose features extracted from one video sequence are fed into a 3-layer LSTM. The output of the LSTM is connected to a classifier $C^{dg}$, to classify the subject's identity. In the example embodiment, a linear classifier is used although other types of classifiers are contemplated by this disclosure.

Let $h^t$ be the output of the LSTM at time step t, which is accumulative after feeding t pose features $f_p$ into it:

$$h^t = LSTM(f_p^1, f_p^2, \ldots, f_p^t). \qquad (7)$$

Now define a loss function for LSTM. One option for identification is to add the classification loss on top of the LSTM output of the final time step:

$$\mathcal{L}_{id-single} = -\log(C_k^{dg}(h^n)), \qquad (8)$$

which is the negative log likelihood that the classifier $C^{dg}$ correctly identifies the final output $h^n$ as its identity label k. In other words, the loss function quantifies likelihood that output from the classifier correctly identified the particular person.

Due to the nature of LSTM, the output $h^t$ can be greatly affected by its last input $f_p^t$. Hence, the LSTM output, $h^t$, could be unstable across time steps. With a desire to obtain a gait feature that is robust to the final instance of a walking cycle, choose to use the averaged LSTM output as the gait feature for identification:

$$f_{dyn-gait}^t = \frac{1}{t} \sum_{s=1}^t h^s \qquad (9)$$

The identification loss can be rewritten as:

$$\mathcal{L}_{id-avg} = -\log(C_k^{dg}(f_{dyn-gait}^n)) = -\log\left(C_k^{dg}\left(\frac{1}{n}\sum_{s=1}^n h^s\right)\right). \qquad (10)$$

LSTM is expected to learn that the longer the video sequence, the more walking information it processes then the more confident it identifies the subject. Instead of minimizing the loss at the final time step, this disclosure proposes to use all the intermediate outputs of every time step weighted by $w_t$:

$$\mathcal{L}_{id-inc-avg} = \frac{1}{\sum_{t=1}^n w_t} \sum_{t=1}^n -w_t \log\left(C_k^{dg}\left(\frac{1}{t}\sum_{s=1}^t h^s\right)\right) \qquad (11)$$

where $w_t = t^2$ and other options such as $w_t = 1$ also yield similar performance. In the experiments, the impact of three options are ablated in classification loss: $L_{id-single}$, $L_{id-avg}$, and $L_{id-inc-avg}$. To this end, the overall loss function is:

$$\mathcal{L} = \mathcal{L}_{id-inc-avg} + \lambda_r \mathcal{L}_{xrecon} + \lambda_d \mathcal{L}_{pose-sim} + \lambda_s \mathcal{L}_{cano-sim}. \qquad (12)$$

In one example, the first encoder-decoder network 21 is implemented as a convolutional neural network. The entire system 20, including first encoder 23, the decoder 24, the secondary encoder 25, and the second neural network 22 (i.e., LSTM) are jointly trained. Updating ε to optimize $L_{id-inc-avg}$ also helps to further generate pose feature that has identity information and on which LSTM is able to explore temporal dynamics.

Figure 3:
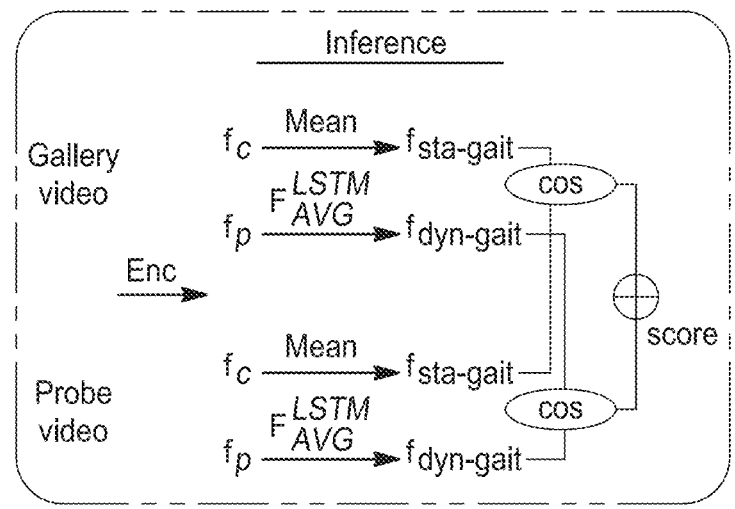
FIG. 3 is a diagram of illustrating an inference process for identifying a person.

FIG. 3 further illustrates the inference process for identifying a person. Once the first encoder 23 has been trained, only the first encoder 23 and the second neural network 22 are needed for inference. The first encoder receives a video sequence as input and disentangles the pose features and the canonical features. The pose features are in turn input to the second neural network 22 which aggregates them to form the dynamic gait feature, $f_{dyn-gait}$. The canonical features are averaged to form a static gait feature, $f_{sta-gait}$.

For authentication and/or identification, one score is needed to measure similarity between a person captured in an input video and feature sets stored for known persons. In the example embodiment, the cosine similarity score is used as a similarity metric, where the cosine similarity scores are normalized to the range of [0,1] via min-max. A first similarity score is calculated to compare the static gait features and a second similarity score is calculated for the dynamic gait features. The two similarity scores are then fused, for example by a weighted sum rule:

$$\text{Score}=(1-\partial)*\text{Cos}(f_{sta-gait}^g, f_{sta-gait}^p)+\propto*\cos(f_{dyn-gait}^g, f_{dyn-gait}^p), \quad (13)$$

where g and p represent features from known person and features from the unknown person, respectively. Other similarity metrics, such L1 distance or L2 distance, also fall within the scope of this disclosure.

For demonstration purposes, an example implementation of the network architecture 20 is described below. A person of interest is first segmented from the video frames captured by the system. The foreground mask is obtained from the SOTA instance segmentation algorithm, Mask R-CNN. Instead of using a zero-one mask by hard thresholding, maintain the soft mask returned by the network, where each pixel indicates the probability of being a person. This is partially due to the difficulty in choosing an appropriate threshold suitable for multiple databases. Also, it remedies the loss in information due to the mask estimation error. A bounding box is used with a fixed ratio of width:height=1:2 with the absolute height and center location given by the Mask R-CNN network. The input to the system is obtained by pixel-wise multiplication between the mask and the normalized RGB values, and then resizing to 32×64 pixels. This applies to all the experiments on CASIA-B, USF and FVG datasets described below.

In the example implementation, the encoder-decoder network is a convolutional neural network illustrated in Table 4. Stride-1 convolution layers and max pooling layers are used in place of stride-2 convolution layers, since one finds the latter is able to achieve the similar results with less hyper-parameter searching for different training scenarios. Each convolution layer is followed by Batch Normalization and Leaky ReLU activation. The decoder structure is built from transposed 2D convolution, Batch Normalization and Leaky ReLU layers. The final layer is a Sigmoid activation which can output the value into range as the input. All the transposed convolutions are with stride of 2 to up sample images and all the Leaky ReLU are with slope of 0.2. The classification pan is a stacked 3-layer LSTM, which has 256 hidden units in each cell. The length of $f_a$, $f_c$ and $f_p$ is 128, 128 and 64 respectively, as shown in Table 2.

The Adam optimizer is initialized with the learning rate of 0.0001, and the momentum of 0.9. To prevent over-fitting, the weights decay of 0.001 is applied to all the experiments, and the learning rate decays by multiplying 0.9 in every 500 iterations. For each batch, use video frames from 16 or 32 different clips depending on different experiment protocols. Since video lengths are varied, a random crop of 20-frame sequence is applied during training; all shorter videos are discarded. The $\lambda_r$, $\lambda_s$ and $\lambda_d$ in equation 12 are all set to 1 in all experiments.

Figure 4:
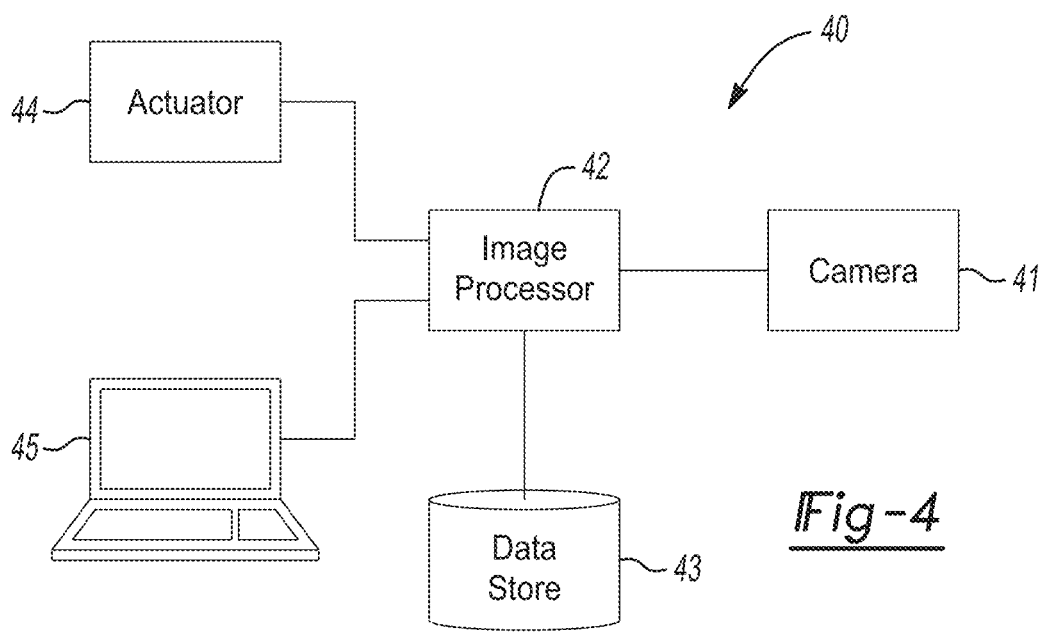
FIG. 4 is a diagram of an example recognition system.

FIG. 4 depicts an example recognition system 40. The recognition system 40 is comprised of one or more imaging devices 41 (e.g., cameras), an image processor 42 and a data store 43. Each imaging device is configured to capture a video (i.e., a set of images) of a scene. The video in turn serves as input to the image processor 42. Feature sets taken from different persons are stored in the data store 43 as noted above and made accessible to the image processor 42.

The network architecture 20 is implemented by the image processor 42. The image processor 42 operates to extract a person (if any) from the input video and attempt to identify the person using the technique described above. When a person has been positively identified, the image processor 42 may actuate an actuator 44, for example to unlock a lock on a door. Alternatively or additionally, outcome of the image processor may be input into a monitoring system 45. The monitoring system 45 may enable a user to view the scene and include labels associated with persons identified in the scene captured by the cameras. These applications are intended to be illustrative. Other applications for the identification of persons captured in the input video are also envisioned by this disclosure.

To facilitate the research of gait recognition from frontal-view angles, a Front-View Gait (FVG) database is compiled over the course of two years (2017 and 2018). During the capturing, the camera (Logitech C920 Pro Webcam or GoPro Hero 5) is placed on a tripod at the height of 1.50 meters. Each of 226 subjects are required to walk toward the camera 12 times starting from around 16 meters away from the camera, which results in 12 videos per subject. The videos are captured at 1,080×1,920 resolution with 15 FPS and the average length of 10 seconds. The height of body in the video ranges from 101 to 909 pixels, and the height of faces ranges from 17 to 467 pixels. These 12 walks have the combination of three angles toward the camera (−45°, 0°, 45° off the optical axes of the camera), and four variations. As detailed in Table 5, FVG is collected in three sessions with five variations: normal, walking speed (slow and fast), clothing changes, carrying/wearing change (bag or hat), and clutter background (multiple persons). The five variations are well balanced in three sessions.

Different from prior gait databases, subjects in FVG are walking toward the camera, which creates a great challenge on exploiting gait information as the visual difference in consecutive frames is normally much smaller than side-view walking. This evaluation focuses on variations that are challenging, e.g., different clothes, carrying a bag while wearing a hat, or are not presented in prior databases, e.g., multi-person. To benchmark research on FVG, five evaluation protocols are defined, among which there are two commonalities: 1) the first 136 and remaining 90 subjects are used for training and testing respectively; and 2) the video 2, the normal frontal-view walking, is always used as the gallery. The five protocols differ in their respective probe data, which cover the variations of Walking Speed (WS), Carrying Bag while Wearing a Hat (BGHT), Changing Clothes (CL), Multiple Persons (MP), and all variations (ALL). At the top part of Table 5, the detailed probe sets are listed for all 5 protocols. For instance, for the WS protocol, the probes are video 4-9 in Session 1 and video 4-6 in Session 2. In all protocols, the performance metrics are the True Accept Rate (TAR) at 1% and 5% False Alarm Rate (FAR).

The proposed recognition system is evaluated on three gait databases, CASIA-B, USF and FVG. CASIA-B and USF are the most widely used gait databases, which helps one to make comprehensive comparisons with prior works. The OU-ISIR database is not evaluated, and related results are not compared since this disclosure consumes RGB video input, but OU-ISIR only releases silhouettes. Finally, experiments were conducted to compare the proposed recognition system with the state-of-the-art face recognition method ArcFace on the CASIA-B and FVG datasets.

While the decoder 54 is only useful in training, but not model inference, it can enable one to visualize the disentangled features as a synthetic image, by feeding either the feature itself, or their random concatenation, into the learned decoder D. This synthesis helps to gain more understanding of the feature disentanglement.

The decoder 54 requires the concatenation of three vectors for synthesis. Hence, to visualize each individual feature, concatenate it with two vectors of zeros and then feed to decoder 54. FIG. 5 shows the disentanglement visualization of four subjects (two frontal and two side views), each under the NM and CL conditions. First of all, the canonical feature discovers a standard body pose that is consistent across both subjects, which is more visible in the side view. Under such a standard body pose, the canonical feature then depicts the unique body shape, which is consistent within a subject but different between subjects. The appearance feature faithfully recovers the color and texture of clothing, at the standard body pose specified by the canonical feature. The pose feature captures the walking pose of the input frame. Finally, combining all three features can closely reconstruct the original input. This shows that disentanglement not only preserves all information of the input, but also fulfills all the desired properties described in Table 3.

With reference to FIG. 6, each result is generated by pairing the pose-irrelevant feature $\{f_a, f_c\}$ in the first column, and the pose feature $f_p$ in the first row. The synthesized images show that indeed pose-irrelevant feature contributes all the appearance and body information, e.g., cloth, body width, as they are consistent across each row. Meanwhile, $f_p$ contributes all the pose information, e.g., positions of hand and feet, which share similarity across columns. Despite that concatenating vectors from different subjects may create samples outside the input distribution of D, the visual quality of synthetic images shows that D is versatile to these new samples.

To gain more insight into the frame-level features $f_a$, $f_c$, $f_p$ and sequence-level LSTM feature aggregation, apply t-SNE to these features to visualize their distribution in a 2D space. With the learnt models, randomly select two videos under NM and CL conditions for each of five subjects.

Figure 7A:
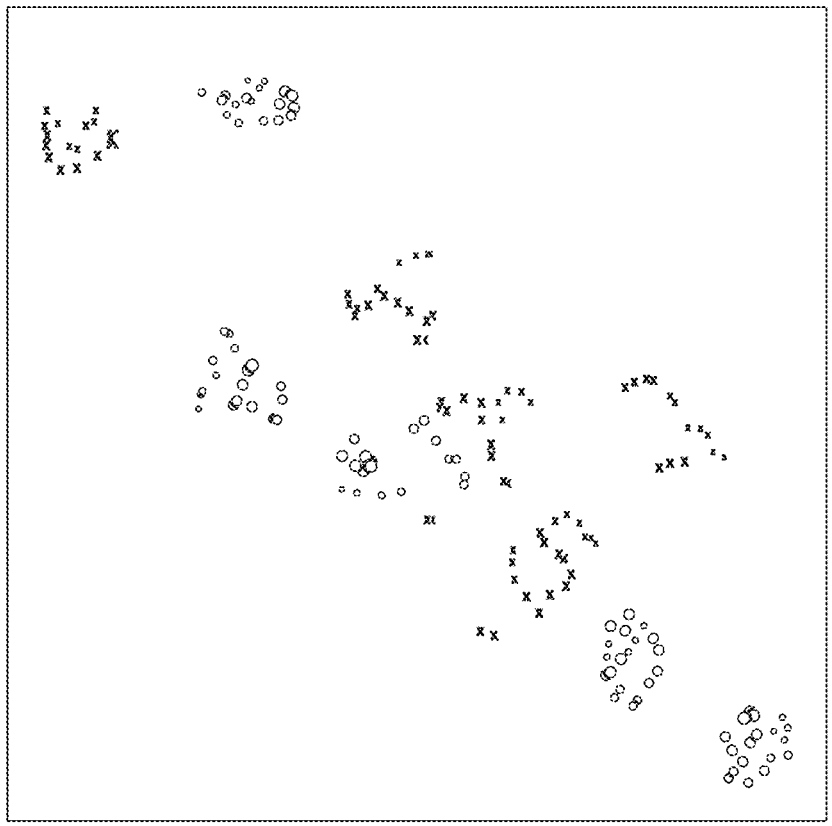
Figure 7B:
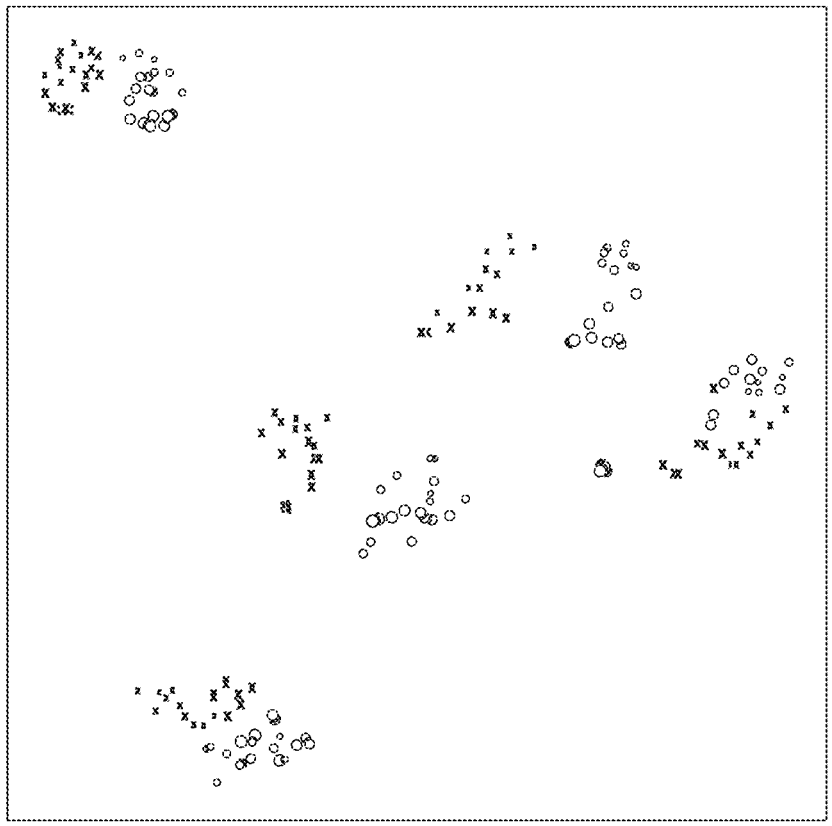
Figure 7C:
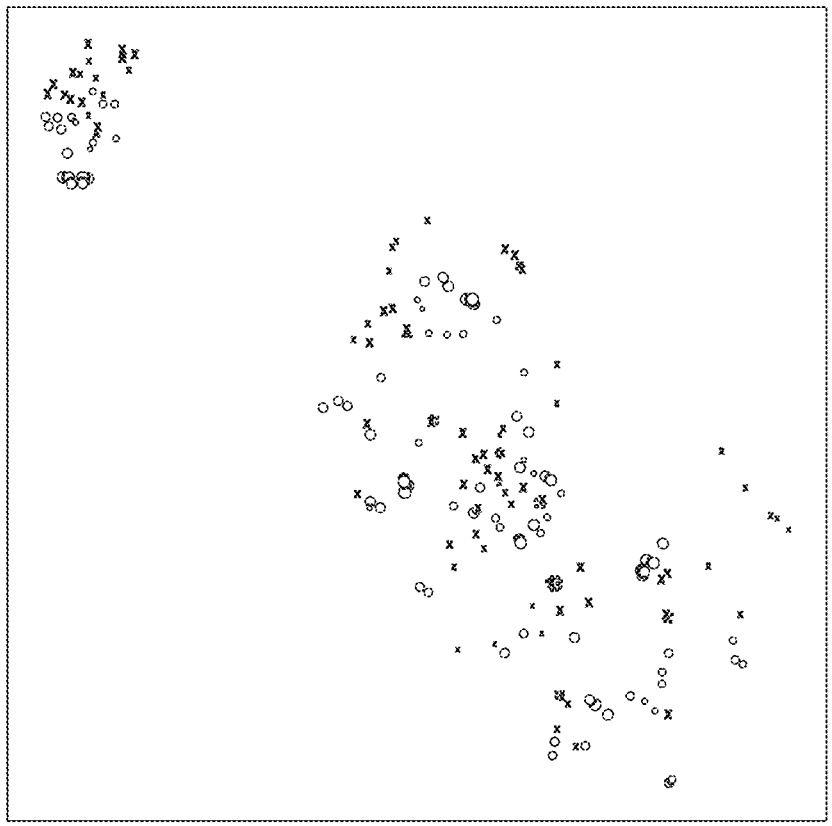
Figure 7D:
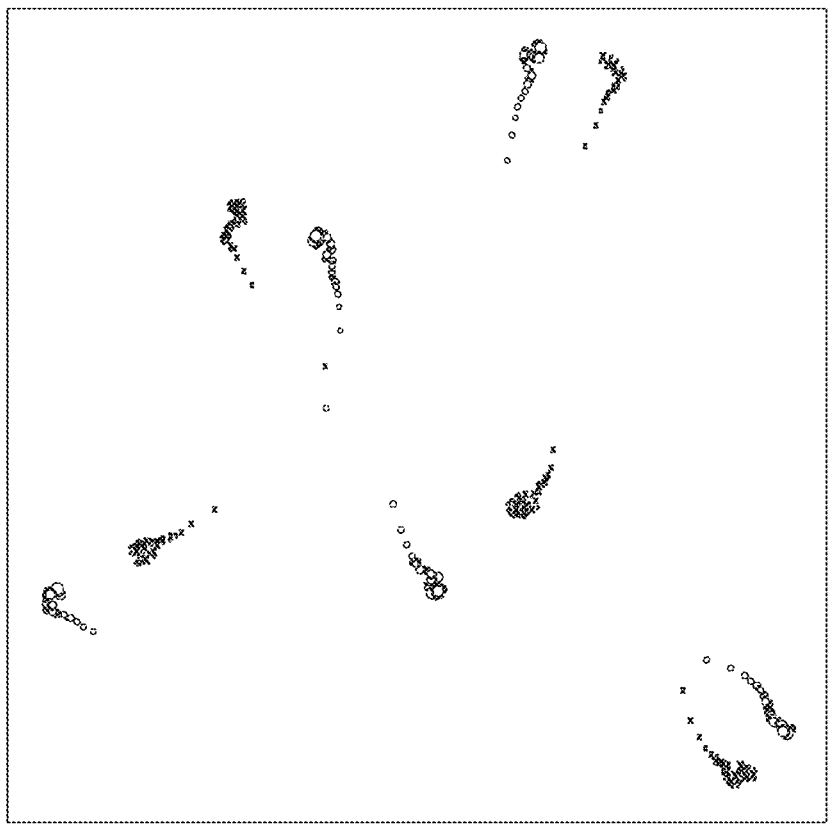

FIGS. 7A and 7B visualizes the $f_a$ and $f_c$ features, respectively. Obviously, for the appearance feature $f_a$, the margins between intra-class and inter-class distances are unpromising, which shows that $f_a$ has limited discrimination power. In contrast, the canonical feature $f_c$ has both the compact intra-class variations and separable interclass differences—useful for identity classification. In addition, visualize the $f_p$ from ε and its corresponding $f_{dyn-gait}$ at each time step in FIGS. 7C and 7D. As defined in equation 4, enforce the averaged $f_p$ of the same subject to be consistent under different conditions. Since equation 4 only minimizes the intra-class distance, which cannot guarantee the discrimination among subjects. However, after aggregation by the LSTM network, distances of points at longer time duration for inter-class are substantially enlarged.

With the cross reconstruction loss, the appearance feature $f_a$ and canonical feature $f_c$ can be enforced to represent static information that shares across the video. However, as discussed, $f_p$ could be contaminated by the appearance information or even encode the entire video frame. Here, the benefit of the pose similarity loss $L_{pose-sim}$ to feature disentanglement is shown. FIG. 8 shows the cross visualization of two different models learned with and without $L_{pose-sim}$.

Without $L_{pose-sim}$ the decoded image shares some appearance and body characteristic. e.g., cloth style, contour, with $f_p$. Meanwhile with $L_{pose-sim}$ appearance better matches with $f_a$ and $f_c$.

As there are various options in designing the framework, their effect on the final recognition performance can be ablated from three perspectives: the disentanglement loss, the classification loss, and the classification feature. Table 6 reports the Rank-1 recognition accuracy of different variants of our framework on CASIA-B under NM vs. CL and lateral view. The model is trained with all videos of the first 74 subjects and tested on the remaining 50 subjects.

First, explore the effects of different disentanglement losses applied to $f_{dyn-gait}$, and use $f_{dyn-gait}$ only for classification. Using $L_{id-inc-avg}$ as the classification loss, train different variants of the framework: a baseline without any disentanglement losses, a model with $L_{xrecon}$ and a model with both $L_{xrecon}$ and $L_{pose-sim}$. The baseline achieves the accuracy of 56.0%. Adding $L_{xrecon}$ slightly improves the accuracy to 60.2%. By combining with $L_{pose-sim}$, the model significantly improves the accuracy to 85.6%. Between $L_{xrecon}$ and $L_{pose-sim}$, the pose similarity loss plays a more critical role as $L_{xrecon}$ is mainly designed to constrain the appearance feature, which does not directly benefit identification.

Also compare the effects of different classification losses applied to $f_{dyn-gait}$. Even though the classification loss only affects $f_{dyn-gait}$, the performance with both $f_{dyn-gait}$ and $f_{sta-gait}$ is reported for a direct comparison with our full model in the last row. With the disentanglement loss of $L_{xrecon}$, $L_{pose-sim}$ and $L_{cano-sim}$, benchmark different options of the classification loss, as well as the autoencoder loss described by Srivastava et al in "Unsupervised learning of Video Representations using LSTMs" International Conference on Machine learning 2015. The model using the conventional identity loss on the final LSTM output L id-single achieves the rank-1 accuracy of 72.5%. Using the average output of LSTM as the identity feature, $L_{id-avg}$ improves the accuracy to 82.6%. The autoencoder loss achieves a good performance of 76.5%. However, it is still far from the proposed incremental identity loss $L_{id-inc-avg}$'S performance at 92.1%. FIG. 9 further visualizes the $f_{dyn-gait}$ over time, for two models learnt with $L_{id-single}$ and $L_{id-inc-avg}$ loss respectively. Clearly, even with less than 10 frames, the model with $L_{id-inc-avg}$ shows more discriminativeness, which also increases rapidly as time progresses.

Finally, compare different features in computing the final classification score. The performance is based on the model with full disentanglement losses and $L_{id-inc-avg}$ as the classification loss. When $f_a$ is utilized in cosine distance calculation, the rank-1 accuracy is merely 33.4%, while $f_{sta-gait}$ and $f_{dyn-gait}$ achieve 76.3% and 85.9% respectively. The results prove the learnt $f_c$ and $f_p$ are effective for classification while $f_a$ has limited discriminative power. Also, by combining both $f_{sta-gait}$ and $f_{dyn-gait}$ features, the recognition performance can be further improved to 92.1%. It is believed that such performance gain is owing to the complementary discriminative information offered by $f_{sta-gait}$, w.r.t. $f_{dyn-gait}$.

Since $f_{dyn-gait}$ and $f_{sta-gait}$ are complementary in classification, it is interesting to understand their relative contributions, especially in the various scenarios of gait recognition. This amounts to exploring a global weight a for the proposed recognition system on various training data, where a ranges from 0 to 1. There are three protocols on CASIA-B and hence three models are trained respectively. Calculate the weighted score of all three models on the training data of protocol 1, since it is the most comprehensive and representative protocol covering all the view angles and conditions. The same experiment is conducted on "ALL" protocol of the FVG dataset.

As shown in FIG. 10, the proposed recognition system has the best average performance on CASIA-B when a, is around 0.2, while on FVG a is around 0.75. According to equation 13, $f_{sta\text{-}gait}$ has relatively more classification contributions on CASIA-B. One potential reason is that it is more challenging to match dynamic walking poses under large range of view angles. In comparison. FVG favors $f_{dyn\text{-}gait}$. Since FVG is an all-frontal-walking dataset containing varying distances or resolutions, dynamic gait is relatively easier to learn with the fixed view, while $f_{sta\text{-}gait}$ might be sensitive to resolution changes.

Nevertheless, note that in the two extreme cases, where only $f_{sta\text{-}gait}$, or $f_{dyn\text{-}gait}$ is used, there is a relatively small performance gap between them. This means that either feature is effective in classification. Considering this fact and the balance between databases, we choose to set $\alpha=0.5$. which will be used in all subsequent experiments.

One interesting question to study is that, how many video frames are needed to achieve reliable gait recognition. To answer this question, compare the performance with different feature scores ($f_{sta\text{-}gait}$, $f_{dyn\text{-}gait}$ and their fusion) for identification, with different video lengths. As shown in FIG. 11, both dynamic and static features achieve stable performance starting from about 10 frames, after which the gain in performance is relatively small. At 15 FPS, a clip of 10 frames is equivalent to merely 0.7 seconds of walking. Further, the static gait feature has notable good performance even with a single video frame. This impressive result shows the strength of the proposed recognition system in processing very short clips. Finally, for most of the frames in this duration, the fusion outperforms both the static and dynamic gait feature alone.

Since various experimental protocols have been defined on CASIA-B, for a fair comparison, strictly follow the respective protocols in the baseline methods. Protocol 1 uses the first 74 subjects for training and the remaining 50 for testing, regarding variations of NM (normal), BG (carrying bag) and CL (wearing a coat) with crossing view angles of 0° to 10°. Three models are trained for comparison in Table 7. Under multiple view angles and cross three variations, the proposed recognition system achieves the best performance compared to all SOTA methods and GaitNet-pre since $f_c$ can distil more discriminative information under various view angles and conditions.

Recently, Chen et al. propose new protocols to unify the training and testing where only one single model is trained for each protocol. Protocol 2 focuses on walking direction variations, where all videos used are in the NM subset. The training set includes videos of the first 24 subjects in all view angles. The rest 100 subjects are for testing. The gallery is made of four videos at 90° view for each subject. The first two videos from the remaining view angles are the probe. The Rank-1 recognition accuracies are reported in Table 8. The proposed recognition system achieves the best average accuracy of 87.3% across 10 view angles, with significant improvement on extreme views than our preliminary work. For example, at view angles of 0°, and 180°, the improvement margins are both 14%. This shows that more discriminative gait information, such as canonical body shape information, under different views are learned in $f_c$, which contributes to the final recognition accuracy.

Protocol 3 focuses on appearance variations. Training sets have videos under BG and CL. There are 34 subjects in total with 54° to 144° view angles. Different test sets are made with the different combinations of view angles of the gallery and probe as well as the appearance condition (BG or CL). The results are presented in Table 9. Our preliminary work has comparable performance as the SOTA method L-CRF on BG subset while significantly outperforming on CL subset. The proposed recognition system outperforms both subsets. Note that due to the challenge of CL protocol, there is a significant performance gap between BG and CL for all methods except ours, which is yet another evidence that our gait feature has strong invariance to all major gait variations.

Across all evaluation protocols, the proposed recognition system consistently outperforms the state of the art. This shows the superiority of the proposed recognition system on learning a robust representation under different variations. It is contributed to our ability to disentangle pose/gait information from appearance variations. Comparing with our preliminary work, the canonical feature fc contains discriminative power which can further improve the recognition performance.

Given that FVG is a newly collected database and no reported performance from prior work, four classic or SOTA methods on gait recognition are implemented. Furthermore, given a large amount of effort in human pose estimation, aggregating joint locations over time can be a good candidate for gait features. Therefore define another baseline, named PE-LSTM, using pose estimation results as the input to the same LSTM and classification loss. Using SOTA 2D pose estimation, extract 14 joints' locations, feed to the 3-layer-LSTM, and train with the proposed LSTM incremental loss. For each of five baselines and the proposed recognition system, one model is trained with the 136-subject training set and tested on all five protocols.

As shown in Table 10, the proposed recognition system shows state-of-the-art performance compared with baselines, including the recent CNNbased methods. Among 5 protocols, CL is the most challenging variation as in CASIA-B. Comparing with all different methods, GEi based methods suffer from frontal view due to the lack of walking information. Again, thanks to the discriminative canonical feature $f_c$, the proposed recognition system achieves better recognition accuracies than GaitNet-pre. Also, the superior performance of the proposed recognition system over PE-LSTM demonstrates that our feature $f_p$ and $f_c$ does explore more discriminate information than the joints' locations alone.

Face recognition aims to identify subjects by extracting discriminative identity features, or representation, from face images. Due to the vigorous development in the past few years, the face recognition system is one of the most studied and deployed systems in the vision community, even superior to humans on some tasks.

However, the challenge is particularly prominent in the video surveillance scenario, where low-resolution and/or non-frontal faces are acquired at a distance. While gait, as a behavioral biometric compared to face, might have more advantages in those scenarios since the dynamic information can be more resistant even at a lower resolution and different view angles. $f_{sta\text{-}gait}$ and $f_{dyn\text{-}gait}$ can have complementary contributions in changing distances, resolutions and view angles. Therefore, to explore the advantages and disadvantages of gait recognition and face recognition in the surveillance scenario, the proposed recognition system is compared with the most recent SOTA face recognition method, Arc-Face, on the CASIA-B and FVG databases.

Specifically, for face recognition, first employ SOTA face detection algorithm RetinaFace to detect face and ArcFace to extract features for each frame of gallery and probe videos. Then the features over-all frames of a video are aggregated by average pooling, an effective scheme used in prior video-based face recognition work. Next, measure the similarity of features by their cosine distance. To keep consistency with the above gait recognition experiments, both face and gait report TAR at 1% FAR for FVG and Rank-1 score for CASIA-B. To evaluate the effects of time, use the entire sequence as the gallery and partial (e.g., 10%) sequence as the probe on 10 points on the time axis ranging from 10% to 100%.

In this experiment, select the videos of the NM as gallery and both CL and BG are probes. Compare gait and face recognition in three scenarios: frontal-frontal, side-side and side-frontal view angles. FIG. 12 shows the Rank-1 scores over the time duration. As the video begins, the proposed recognition system is significantly superior to face in all scenarios since our $f_{sta\text{-}gait}$ can capture discriminative information such as body shape in low-resolution images, while faces are of too low resolution to perform meaningful recognition. As time progresses, the proposed recognition system is stable to the resolution change and view variations, with increasing accuracy. In comparison, face recognition always has lower accuracies throughout the entire duration, except the frontal-frontal view face recognition slightly outperforms gait in the last 20% of the duration, which is expected as this is toward the ideal scenario for face recognition to shine. Unfortunately, for side-side or side frontal views, face recognition continues to struggle even at the end of the duration.

Further compare the proposed recognition system with ArcFace on FVG with NMBGHT and NM-ALL* protocols. Note that the videos of NMBGHT contain variations in carrying bags and wearing hats. The videos of ALL*, different from ALL in Table 10, include all the variations in FVG except carrying and wearing a hat variations (refer to Table 5 for details). As shown in FIG. 12, on the BGHT protocol, gait outperforms face in the entire duration, since wearing hat dramatically affects face recognition but not gait recognition. For ALL* protocol, face outperforms gait in the last 20% duration because by then low resolution is not an issue and FVG has frontal-view faces.

FIG. 13 shows some examples in CASIB-B and FVG, which are incorrectly recognized by face recognition. The low resolution and illumination conditions in these videos are the main reasons for failure. Note that while video-based alignment, or super-resolution approaches might help to enhance the image quality, their impact to recognition is beyond the scope of this work.

System efficiency is an essential metric for many vision systems including gait recognition. We calculate the efficiency while each of the 5 gait recognition methods processing one video of the FVG dataset on the same desktop with GeForce GTX 1080 Ti GPU. All the coding are implemented in PyTorch Framework of Python programming language. Parallel computing of batch processing is enabled for GPU on all the inference models, where batch size is the number of samples in the probe. Alphapose and Mask-R-CNN takes batch size of 1 as input in inference. As shown in Table 11, the proposed recognition system is faster than the pose estimation method because of 1) an accurate, yet slow, version of AlphaPose is required for model-based gait recognition method; and 2) only low-resolution input of 32×64 pixels is needed for the proposed system.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real-time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

TABLE 1

Comparison of existing gait databases and our collected FVG database.

| Dataset | # Subjects | # Videos | Environment | FPS | Resolution | Format | Variations |
|---|---|---|---|---|---|---|---|
| CASIA-B | 124 | 13,640 | Indoor | 25 | 320 × 240 | RBG | View, Clothing, Carrying |
| USF | 122 | 1,870 | Outdoor | 30 | 720 × 480 | RBG | View, Ground Surface, Shoes, Carrying, Time |
| OU-ISIR-LP | 4,007 | — | Indoor | — | 640 × 480 | Silhouette | View |
| OU-ISIR-LP-Bag | 62,528 | — | Indoor | — | 1,280 × 980 | Silhouette | Carrying |
| FVG (ours) | 226 | 2,856 | Outdoor | 15 | 1,920 × 1,080 | RGB | View, Walking Speed, Carrying, Clothing, Multiple people, Time |

TABLE 2

Symbols and notations.

| Symbol | Dim. | Notation |
|---|---|---|
| $s$ | scalar | Index of subject |
| $c$ | scalar | Condition |
| $t$ | scalar | Time step in a video |
| $n$ | scalar | Number of frames in a video |
| $X^c$ | matrices | Gait video under condition $c$ |
| $x^{c,t}$ | matrix | Frame $t$ of video $x^c$ |
| $\hat{x}$ | matrix | Reconstructed frame via $\mathcal{D}$ |
| $\varepsilon$ | — | Encoder network |
| $\mathcal{D}$ | — | Decoder network |
| $\mathcal{C}^{sg}$ | — | Classifier for $f_c$ |
| $\mathcal{C}^{dg}$ | — | Classifier for $f_{dyn\text{-}gait}$ |
| $f_p$ | 64 × 1 | Pose feature |
| $f_c$ | 128 × 1 | Canonical feature |
| $f_a$ | 128 × 1 | Appearance feature |
| $f_{dyn\text{-}gait}$ | 256 × 1 | Dynamic gait feature |
| $f_{sta\text{-}gait}$ | 128 × 1 | Static gait feature |
| $h^t$ | 128 × 1 | The output of LSTM at step $t$ |
| $L_{xrecon}$ | — | Reconstruction loss |
| $L_{pose\text{-}sim}$ | — | Pose similarity loss |
| $L_{cano\text{-}sim}$ | — | Canonical similarity loss |
| $L_{id\text{-}inc\text{-}avg}$ | — | Incremental identity loss |

TABLE 3

The properties of three disentangled features in terms of its constancy across frames and conditions, and discriminativeness. These properties are the basis for us to design loss function for feature disentanglement.

| | Constant Across Frames | Constant Across Conditions | Discriminative |
|---|---|---|---|
| $f_a$ | Yes | No | No |
| $f_c$ | Yes | Yes | Yes |
| $f_p$ | No | Yes | Yes for $f_p$ over t |

TABLE 4

The architecture of $\varepsilon$ and $\mathcal{D}$ networks. Note the layer with ( )* is removed for experiments with small training sets, i.e, all ablation studies in Sec. 5.1 to prevent overfitting.

| | $\varepsilon$ | | | $\mathcal{D}$ | |
|---|---|---|---|---|---|
| Layers | Filter/Stride | Output Size | Layers | Filter/Stride | Output Size |
| Conv1 | 3 × 3/1 | 64 × 32 × 64 | FC | — | 4 × 2 × 512 |
| MaxPool1 | 3 × 3/2 | 32 × 16 × 64 | FCCConv1 | 3 × 3/2 | 8 × 4 × 256 |

TABLE 4-continued

The architecture of $\varepsilon$ and $\mathcal{D}$ networks. Note the layer with ( )* is removed for experiments with small training sets, i.e, all ablation studies in Sec. 5.1 to prevent overfitting.

| | $\varepsilon$ | | | $\mathcal{D}$ | |
|---|---|---|---|---|---|
| Layers | Filter/Stride | Output Size | Layers | Filter/Stride | Output Size |
| Conv2 | 3 × 3/1 | 32 × 16 × 256 | FCCConv2 | 3 × 3/2 | 16 × 8 × 128 |
| MaxPool2 | 3 × 3/2 | 16 × 8 × 256 | FCCConv3 | 3 × 3/2 | 32 × 16 × 64 |
| Conv3 | 3 × 3/2 | 16 × 8 × 512 | FCCConv4 | 32 × 16 × 3 | |
| (Conv4 | 3 × 3/2 | 16 × 8 × 512 | | | |
| MaxPool3 | 3 × 3/2 | 4 × 2 × 512 | | | |
| FC | — | 320 | | | |

TABLE 5

The FVG database. The last 5 rows show the specific variations that are captured by each of 12 videos per subject.

| Collection Year | 2017 | | | | | | 2018 | | |
|---|---|---|---|---|---|---|---|---|---|
| Session | 1 | | | 2 | | | 3 | | |
| Number of Subjects | 147 | | | 79 | | | 12 | | |
| Viewing Angle (°) | −45 | 0 | 45 | −45 | 0 | 45 | −45 | 0 | 45 |
| Normal | 1 | 2 | 3 | 1 | 2 | 3 | 1 | 2 | 3 |
| Fast/Slow Walking | 4/7 | 5/8 | 6/9 | 4 | 5 | 6 | 4 | 5 | 6 |
| Carrying Bag/Hat | 10 | 11 | 12 | — | — | — | — | — | — |
| Change Clothes | — | — | — | 7 | 8 | 9 | 7 | 8 | 9 |
| Multiple Person | — | — | — | 10 | 11 | 12 | 10 | 11 | 12 |

TABLE 6

Ablation study on various options of the disentanglement loss, classification loss, and classification features. A GaitNet model is trained on NM and CL conditions of lateral view with the first 74 subjects of CASIA-B and tested on remaining subjects.

| Disentanglement Loss | Classification Loss | Classification Feature | Rank-1 |
|---|---|---|---|
| — | $t_{id\text{-}inc\text{-}avg}$ | $f_{dyn\text{-}gait}$ | 56.0 |
| $t_{xrecon}$ | $t_{id\text{-}inc\text{-}avg}$ | $f_{dyn\text{-}gait}$ | 60.2 |
| $t_{xrecon} + t_{pose\text{-}sim}$ | $t_{id\text{-}inc\text{-}avg}$ | $f_{dyn\text{-}gait}$ | 85.6 |
| $t_{xrecon} + t_{pose\text{-}sim} + t_{cano\text{-}sim}$ | $t_{id\text{-}single}$ | $f_{dyn\text{-}gait}$ & $f_{sta\text{-}gait}$ | 72.5 |
| $t_{xrecon} + t_{pose\text{-}sim} + t_{cano\text{-}sim}$ | $t_{id\text{-}ac}$ | $f_{dyn\text{-}gait}$ & $f_{sta\text{-}gait}$ | 76.5 |
| $t_{xrecon} + t_{pose\text{-}sim} + t_{cano\text{-}sim}$ | $t_{id\text{-}inc\text{-}avg}$ | $f_{dyn\text{-}gait}$ & $f_{sta\text{-}gait}$ | 82.6 |
| $t_{xrecon} + t_{pose\text{-}sim} + t_{cano\text{-}sim}$ | $t_{id\text{-}inc\text{-}avg}$ | $f_a$ | 33.4 |
| $t_{xrecon} + t_{pose\text{-}sim} + t_{cano\text{-}sim}$ | $t_{id\text{-}inc\text{-}avg}$ | $f_{sta\text{-}gait}$ | 76.3 |
| $t_{xrecon} + t_{pose\text{-}sim} + t_{cano\text{-}sim}$ | $t_{id\text{-}inc\text{-}avg}$ | $f_{dyn\text{-}gait}$ | 85.9 |
| $t_{xrecon} + t_{pose\text{-}sim} + t_{cano\text{-}sim}$ | $t_{id\text{-}inc\text{-}avg}$ | $f_{dyn\text{-}gait}$ & $f_{sta\text{-}gait}$ | 92.1 |

TABLE 7

Comparison on CASIA-B with cross view and conditions. Three models are trained for NM-NM, NM-BG, NM-CL. Average accuracies are calculated excluding probe viewing angles Gallery NM #1-4 — 0°-180° (exclude identical viewing angle)

| probe NM #5-6 | 0° | 18° | 36° | 54° | 72° | 90° | 108° | 126° | 144° | 162° | 180° | Mean |
|---|---|---|---|---|---|---|---|---|---|---|---|---|
| ViDP | — | — | — | 64.2 | — | 60.4 | — | 65.0 | — | — | — | — |
| LB | 82.6 | 90.3 | 96.1 | 94.3 | 90.1 | 87.4 | 89.9 | 94.9 | 94.7 | 91.3 | 78.5 | 89.9 |
| 3D MT network | 87.1 | 93.2 | 97.9 | 94.5 | 90.2 | 88.3 | 91.1 | 93.8 | 96.5 | 96.0 | 85.7 | 92.1 |
| J-CNN | 87.2 | 93.2 | 96.3 | 95.9 | 91.6 | 86.5 | 89.5 | 93.8 | 95.1 | 93.0 | 80.8 | 91.2 |
| GaitNet-pre | 91.2 | 92.0 | 90.5 | 95.6 | 86.9 | 92.6 | 93.5 | 96.9 | 90.9 | 88.8 | 89 | 91.6 |
| GaitNet | 93.1 | 92.6 | 90.8 | 92.4 | 87.6 | 95.1 | 94.2 | 95.8 | 92.6 | 90.4 | 90.2 | 92.8 |

| Probe BG #1-2 | 0° | 18° | 36° | 54° | 72° | 90° | 108° | 126° | 144° | 162° | 180° | Mean |
|---|---|---|---|---|---|---|---|---|---|---|---|---|
| LB-subGE1 | 64.2 | 80.6 | 82.7 | 76.9 | 64.8 | 63.1 | 68.0 | 76.0 | 82.2 | 76.4 | 61.3 | 72.4 |
| J.CNN | 73.1 | 78.1 | 83.1 | 81.6 | 71.6 | 65.5 | 71.0 | 80.7 | 79.1 | 78.6 | 88.9 | 75.6 |
| GaitNet-pre | 83.0 | 87.8 | 88.3 | 93.3 | 82.6 | 74.8 | 89.5 | 91.9 | 86.1 | 81.2 | 83.6 | 85.7 |
| GaitNet | 88.8 | 88.7 | 88.7 | 94.3 | 85.4 | 92.7 | 91.1 | 92.6 | 84.9 | 84.4 | 86.7 | 88.9 |

| Probe CL #1-2 | 0° | 18° | 36° | 54° | 72° | 90° | 108° | 126° | 144° | 162° | 180° | Mean |
|---|---|---|---|---|---|---|---|---|---|---|---|---|
| LB-subGE1 | 37.7 | 57.2 | 66.6 | 61.1 | 55.2 | 54.6 | 55.2 | 59.1 | 58.9 | 48.8 | 39.4 | 53.98 |
| J-CNN | 46.1 | 58.4 | 64.4 | 61.2 | 55.5 | 50.5 | 54.7 | 55.8 | 53.3 | 51.3 | 39.9 | 54.91 |
| GaitNet-pre | 42.1 | 58.2 | 65.1 | 70.7 | 68.0 | 70.6 | 65.8 | 69.4 | 51.5 | 50.1 | 86.6 | 58.9 |
| GaitNet | 50.1 | 60.7 | 72.4 | 72.1 | 74.6 | 78.4 | 70.3 | 68.2 | 53.5 | 44.1 | 40.8 | 62.3 |

TABLE 8

Recognition accuracy cross views under NM on CASIA-B dataset. One single GaitNet model is trained for all viewing angles.

| Methods | 0° | 18° | 36° | 54° | 72° | 108° | 126° | 144° | 162° | 180° | Average |
|---|---|---|---|---|---|---|---|---|---|---|---|
| CPM | 13 | 14 | 17 | 27 | 62 | 65 | 22 | 20 | 15 | 10 | 24.1 |
| GEI-SVK | 16 | 22 | 35 | 63 | 95 | 95 | 65 | 38 | 20 | 13 | 42.0 |
| CMCC | 18 | 24 | 41 | 66 | 96 | 95 | 68 | 41 | 21 | 13 | 48.9 |
| ViDP | 8 | 12 | 45 | 80 | 100 | 100 | 81 | 50 | 15 | 8 | 45.4 |
| STIP + NN | — | — | — | — | 84.0 | 86.4 | — | — | — | — | — |
| LB | 18 | 36 | 67.5 | 93 | 99.5 | 99.5 | 92 | 66 | 36 | 18 | 56.9 |
| L-CRF | 38 | 75 | 68 | 93 | 98 | 99 | 93 | 67 | 76 | 39 | 67.8 |
| GaitNet-pre | 68 | 74 | 88 | 91 | 99 | 98 | 84 | 75 | 76 | 65 | 81.8 |
| GaitNet | 82 | 83 | 86 | 91 | 93 | 98 | 92 | 90 | 79 | 79 | 87.3 |

TABLE 9

Comparison with CPM and LB| under different walking conditions on CASIA-B by accuracies. One single GaitNet model is trained with all gallery and probe views and the two conditions.

| Probe | Gallery | GaitNet | GaitNet-pre | JUCNet | L-CRF | LB | RLTDA |
|---|---|---|---|---|---|---|---|
| Subset | | | | BG | | | |
| 54 | 36 | 93.5 | 91.6 | 91.8 | 93.8 | 92.7 | 80.8 |
| 54 | 72 | 94.1 | 90.0 | 93.9 | 91.2 | 90.4 | 71.5 |
| 90 | 72 | 98.6 | 95.6 | 95.9 | 94.4 | 93.3 | 75.3 |
| 90 | 108 | 99.3 | 87.4 | 95.9 | 89.2 | 88.9 | 76.5 |
| 126 | 108 | 99.5 | 90.1 | 93.9 | 92.5 | 93.3 | 66.5 |
| 126 | 144 | 90.0 | 93.8 | 87.8 | 88.1 | 86.0 | 72.3 |
| Mean | | 95.8 | 91.4 | 93.2 | 91.5 | 90.8 | 73.8 |
| Subset | | | | CL | | | |
| 54 | 36 | 97.5 | 87.0 | — | 59.8 | 49.7 | 69.4 |
| 54 | 72 | 98.6 | 90.0 | — | 72.5 | 62.0 | 57.8 |
| 90 | 72 | 99.3 | 94.2 | — | 88.5 | 78.3 | 63.2 |
| 90 | 108 | 99.6 | 86.5 | — | 85.7 | 75.6 | 72.1 |
| 126 | 108 | 98.3 | 89.8 | — | 68.8 | 58.1 | 64.6 |
| 126 | 144 | 86.6 | 91.2 | — | 62.5 | 51.4 | 64.2 |
| Mean | | 96.7 | 89.8 | — | 73.0 | 62.5 | 65.2 |

TABLE 10

Definition of FVG protocols and performance comparison. Under each of the 5 protocols, the first/second columns indicate the indexes of videos used in gallery/probe.
Index of Gallery & Probe videos

| Protocol | WS | | BGHT | | CL | | MP | | ALL | |
|---|---|---|---|---|---|---|---|---|---|---|
| Session 1 | 2 | 4-9 | 2 | 10-12 | — | — | — | — | 2 | 1.3-12 |
| Session 2 | 2 | 4-6 | — | — | 2 | 7-9 | 2 | 10-12 | 2 | 1.3-12 |
| Session 3 | — | — | — | — | — | — | — | — | — | 1-12 |
| TAR @ BAR | 1% | 5% | 1% | 5% | 1% | 5% | 1% | 5% | 1% | 5% |
| PE-LSTM | 79.3 | 87.3 | 59.1 | 78.6 | 55.4 | 67.5 | 61.6 | 72.2 | 65.4 | 74.1 |
| GEI | 9.4 | 19.5 | 6.1 | 12.5 | 5.7 | 13.2 | 6.3 | 16.7 | 5.8 | 16.1 |
| GEINet | 15.5 | 35.2 | 11.8 | 24.7 | 6.5 | 16.7 | 17.3 | 35.2 | 13.0 | 29.2 |
| DCNN | 11.0 | 23.6 | 5.7 | 12.7 | 7.0 | 15.9 | 8.1 | 20.9 | 7.9 | 19.9 |
| LB | 53.4 | 73.1 | 23.1 | 50.3 | 23.2 | 38.5 | 56.1 | 74.3 | 40.7 | 61.6 |
| GaitNet-pre | 91.8 | 96.6 | 74.2 | 85.1 | 56.8 | 72.0 | 92.3 | 97.0 | 81.2 | 87.8 |
| GaitNet | 96.2 | 97.5 | 92.3 | 96.4 | 70.4 | 87.5 | 92.5 | 96.0 | 91.9 | 90.3 |

TABLE 11

Runtime (ms per frame) comparison on FVG dataset.

| Methods | Pre-processing | Inference | Total |
|---|---|---|---|
| PE-LSTM | 224.4 | 0.1 | 224.5 |
| GEINet [14] | 89.5 | 1.5 | 91.0 |
| DCNN [13] | 89.5 | 1.7 | 91.2 |
| LB [11] | 89.5 | 1.3 | 90.8 |
| GaitNet (ours) | 89.5 | 1.0 | 90.5 |

What is claimed is:

1. A computer-implemented method for identifying a person, comprising:
    storing a plurality of features sets, such that each feature set corresponds to a different person, where each feature set includes an identifier for a person, canonical features for the person and gait features for the person;
    receiving, by an image processor, a set of images for a given person walking over a period of time;
    extracting canonical features of the given person from the set of images using a first neural network, where the canonical features describe body shape of the given person;
    extracting gait features of the given person from the set of images using the first neural network and a second neural network, where the gait features describe gait of the given person; and
    identifying, by the image processor, the given person by comparing the canonical features of the given person and the gait features of the given person to the plurality of feature sets, where the first neural network and the second neural network are implemented by the image processor.

2. The method of claim 1 wherein extracting canonical features includes extracting a canonical feature from each image in the set of images and averaging the canonical features from each image in the set of images.

3. The method of claim 1 wherein canonical features represent at least one of a shoulder width, a waistline, and a torso to leg ratio.

4. The method of claim 1 further comprises extracting canonical features of the given person from the set of images using a convolutional neural network.

5. The method of claim 1 wherein extracting gait features further comprises
    extracting, by the first neural network, pose features of the given person from the set of images, where the pose features describe pose of the given person; and
    generating the gait features from the pose features using a long short-term memory.

6. The method of claim 1 further comprises identifying the given person by computing a first cosine similarity between the canonical features of the given person and canonical features from a given feature set, computing a second cosine similarity the gait features of the given person to the gait features from the given feature set, and summing the first cosine similarity score and the second cosine similarity score.

7. The method of claim 1 further comprises
    capturing images of a scene using an imaging device, where the scene include the given person walking; and
    for each image, segmenting the given person from the image to form the set of images.

8. The method of claim 1 further comprises
    receiving a first set of training images for a particular person; and
    training the first neural network using the first set of training images in accordance with a first loss function, where the first loss function defines an error between a first image and a second image, such that the first image is reconstructed from appearance features, canonical features and pose features extracted from an image from the first set of training images captured at a given time and the second image is reconstructed from appearance features and canonical feature from the image captured at the given time but pose features from an image from the first set of training images captured at a time subsequent to the given time, wherein the appearance features describe clothes worn by the person.

9. The method of claim 8 further comprises receiving a second set of training images for the particular person, where appearance features for the particular person extracted from the second set of training images differs from the appearance features for the particular person extracted from the first set of training images;

training the first neural network using the first set of training images and the second set of training images in accordance with a second loss function, where the second loss function defines an error mean of the pose features extracted from the first set of training images and a mean of pose features extracted from a second set of training images.

10. The method of claim 9 further comprises training the first neural network using the first set of training images and the second set of training images in accordance with a third loss function, where the third loss function measures consistency of canonical features across images in the first set of training images; measures consistency of canonical features between the first set of training images and the second set of training images; and measures classification of the particular person using canonical features from at least one of the first set of training images and the second set of training images.

11. The method of claim 10 further comprises extracting pose features of the particular person from the first set of training images;

generating gait features from the pose features using a long short-term memory;

classifying the particular person with a classifier using the gait features; and training the second neural network in accordance with a fourth loss function, where the fourth loss function quantifies likelihood that output from the classifier correctly identified the particular person.

12. A non-transitory computer readable medium storing a plurality of feature set and a computer program, where each feature set includes an identifier for a person, canonical features for the person and gait features for the person, the computer program, when executed by a processor, perform to:

receive a set of images for a given person walking over a period of time;

extract canonical features of the given person from the set of images using a first neural network, where the canonical features describe body shape of the given person;

extract gait features of the given person from the set of images using the first neural network and a second neural network, where the gait features describe gait of the given person; and identifying the given person by comparing the canonical features of the given person and the gait features of the given person to the plurality of feature sets.

13. The non-transitory computer readable medium of claim 12 wherein the computer program further perform to extract a canonical feature from each image in the set of images and average the canonical features from each image in the set of images.

14. The non-transitory computer readable medium of claim 12 wherein the computer program further performs to extract pose features of the given person from the set of images, where the pose features describe pose of the given person; and generate the gait features from the pose features using a long short-term memory.

15. The non-transitory computer readable medium of claim 12 wherein the computer program further performs to identify the given person by computing a first cosine similarity between the canonical features of the given person and canonical features from a given feature set, computing a second cosine similarity the gait features of the given person to the gait features from the given feature set, and summing the first cosine similarity score and the second cosine similarity score.

16. The non-transitory computer readable medium of claim 12 wherein the computer program further performs to capture images of a scene using an imaging device, where the scene include the given person walking; and for each image, segment the given person from the image to form the set of images.

17. The non-transitory computer readable medium of claim 12 wherein the computer program further performs to receive a first set of training images for a particular person; and train the first neural network using the first set of training images in accordance with a first loss function, where the first loss function defines an error between a first image and a second image, such that the first image is reconstructed from appearance features, canonical features and pose features extracted from an image from the first set of training images captured at a given time and the second image is reconstructed from appearance features and canonical feature from the image captured at the given time but pose features from an image from the first set of training images captured at a time subsequent to the given time, wherein the appearance features describe clothes worn by the person.

18. The non-transitory computer readable medium of claim 17 wherein the computer program further performs to receive a second set of training images for the particular person, where appearance features for the particular person extracted from the second set of training images differs from the appearance features for the particular person extracted from the first set of training images; and train the first neural network using the first set of training images and the second set of training images in accordance with a second loss function, where the second loss function defines an error mean of the pose features extracted from the first set of training images and a mean of pose features extracted from a second set of training images.

19. The non-transitory computer readable medium of claim 18 wherein the computer program further performs to train the first neural network using the first set of training images and the second set of training images in accordance with a third loss function, where the third loss function measures consistency of canonical features across images in the first set of training images; measures consistency of canonical features between the first set of training images and the second set of training images; and measure classification of the particular person using canonical features from at least one of the first set of training images and the second set of training images.

* * * * *